US008066047B2

(12) United States Patent
Scadden et al.

(10) Patent No.: US 8,066,047 B2
(45) Date of Patent: Nov. 29, 2011

(54) DEVICE FOR ATTACHING A LABEL TO A SUBSTRATE

(75) Inventors: Curt Scadden, Waunakee, WI (US); Michael Ritzke, Poynette, WI (US); John Grosz, Waupun, WI (US); Edward A. Raleigh, Lodi, WI (US); Andrew Terrill, Prairie du Sac, WI (US); Michael Brock, Madison, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 489 days.

(21) Appl. No.: 12/262,462

(22) Filed: Oct. 31, 2008

(65) Prior Publication Data

US 2009/0117387 A1    May 7, 2009

Related U.S. Application Data

(63) Continuation-in-part of application No. 11/470,300, filed on Sep. 6, 2006, now Pat. No. 7,691,218.

(60) Provisional application No. 60/986,169, filed on Nov. 7, 2007, provisional application No. 61/028,647, filed on Feb. 14, 2008.

(51) Int. Cl.
*B29C 65/02* (2006.01)
*B29C 65/74* (2006.01)
*B32B 37/04* (2006.01)
*B32B 38/10* (2006.01)
*B32B 43/00* (2006.01)

(52) U.S. Cl. ......... 156/499; 156/510; 156/513; 156/514

(58) Field of Classification Search ............ 156/155, 156/250–252, 261, 267, 308.2, 308.4, 309.6, 156/324.4, 499, 510, 513, 514
See application file for complete search history.

(56) References Cited

U.S. PATENT DOCUMENTS

| 3,793,112 | A * | 2/1974 | Sontag et al. ........... 156/324.4 |
| 3,919,518 | A * | 11/1975 | Volat ........................ 219/80 |
| 5,983,699 | A * | 11/1999 | Guralp et al. ............... 73/652 |
| 7,290,695 | B2 * | 11/2007 | Koga et al. ................ 228/2.1 |
| 2007/0241163 | A1 * | 10/2007 | Valant et al. ............. 228/2.1 |
| 2008/0053605 | A1 | 3/2008 | Seiders |

FOREIGN PATENT DOCUMENTS

| EP | 0212656 A1 | 3/1987 |
| EP | 1475307 A1 | 11/2004 |
| NL | 1008307 C2 | 8/1999 |
| WO | 83/01051 A1 | 3/1983 |

* cited by examiner

*Primary Examiner* — Sing P Chan
(74) *Attorney, Agent, or Firm* — Whyte Hirschboeck Dudek SC

(57) ABSTRACT

Labels are permanently attached to a substrate, e.g., a tissue cassette, by use of a staking device. The device comprises a staker assembly and a cassette fixture assembly. The cassette fixture assembly includes a slot and a clamping assembly for securing the cassette within the device. The staker assembly includes a set of probes that are heated and sequentially moved into a position to burn a hole in a label that is provisionally attached to the cassette, and then the substrate is melted and displaced through the hole to form a collar bond that permanently attaches the label to the cassette. The label remains attached to the cassette when exposed to harsh environmental conditions, e.g., high heat, high humidity, solvents, etc.

17 Claims, 30 Drawing Sheets

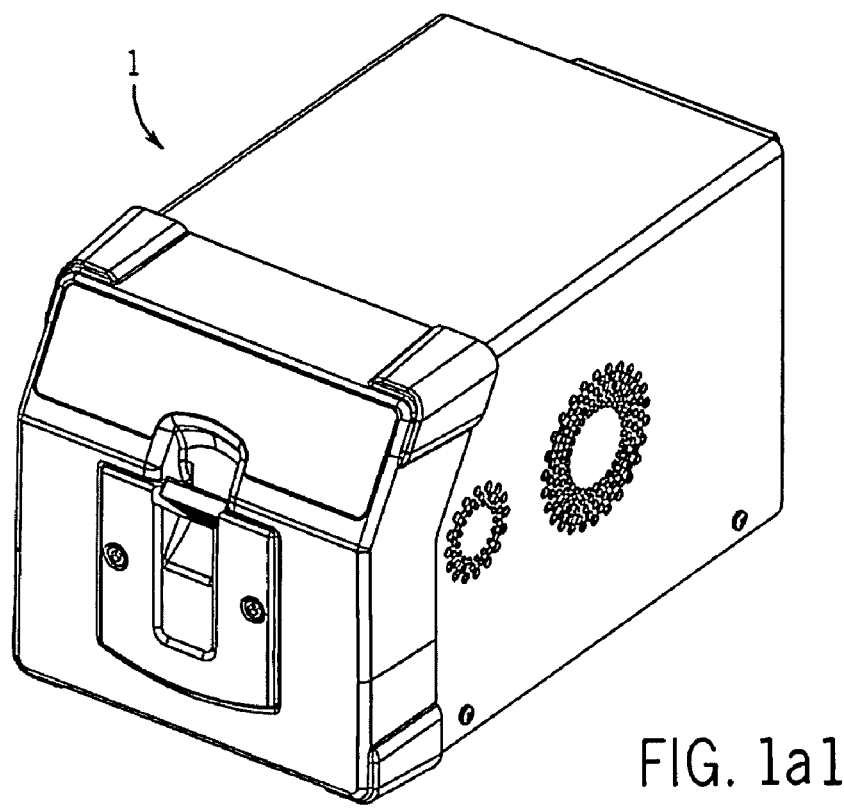
FIG. 1a1
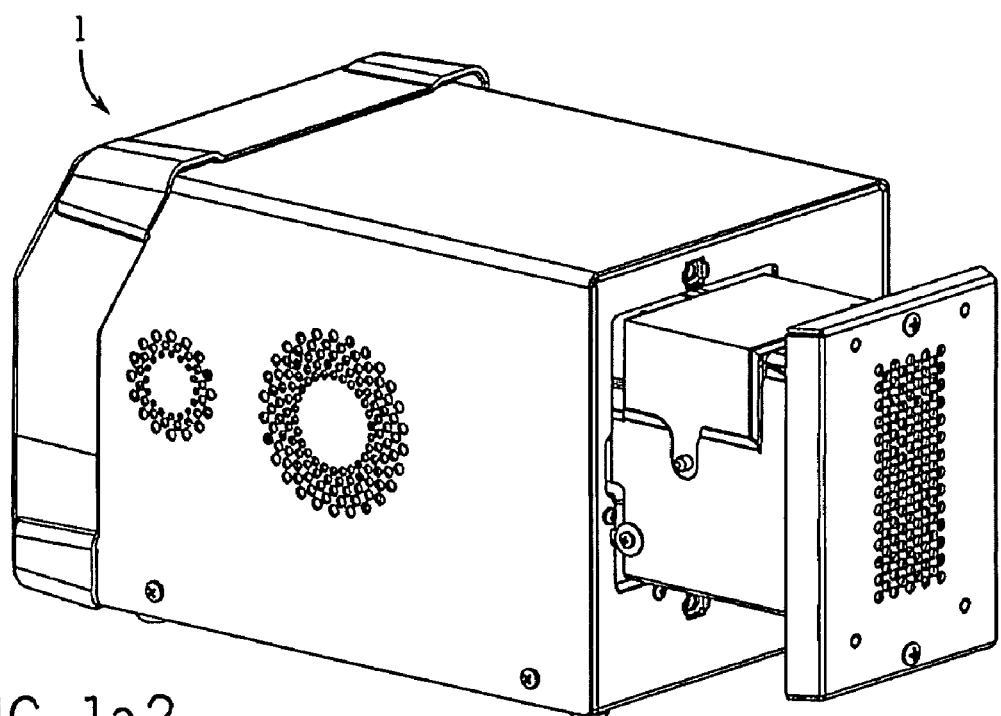
FIG. 1a2

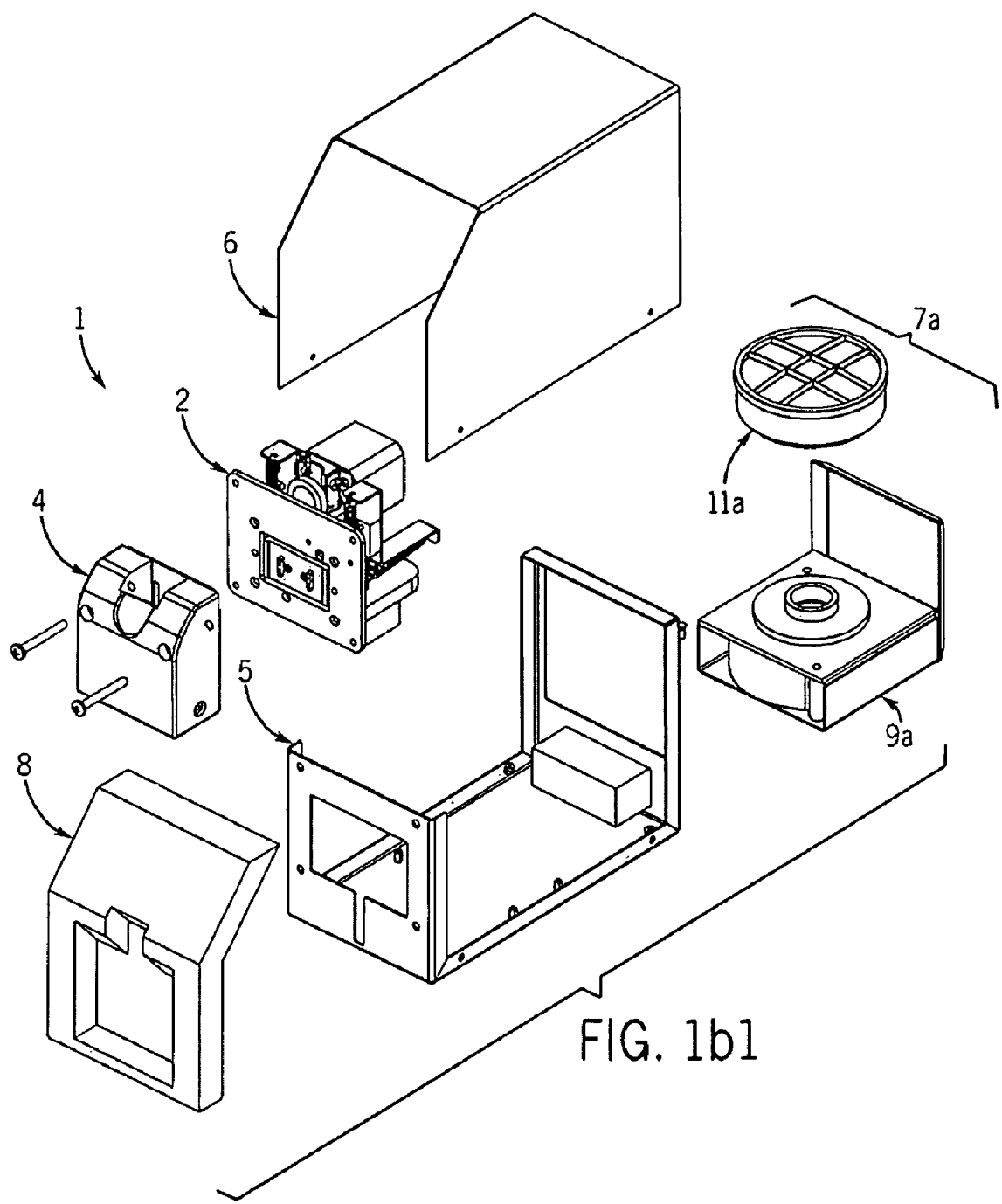
FIG. 1b1

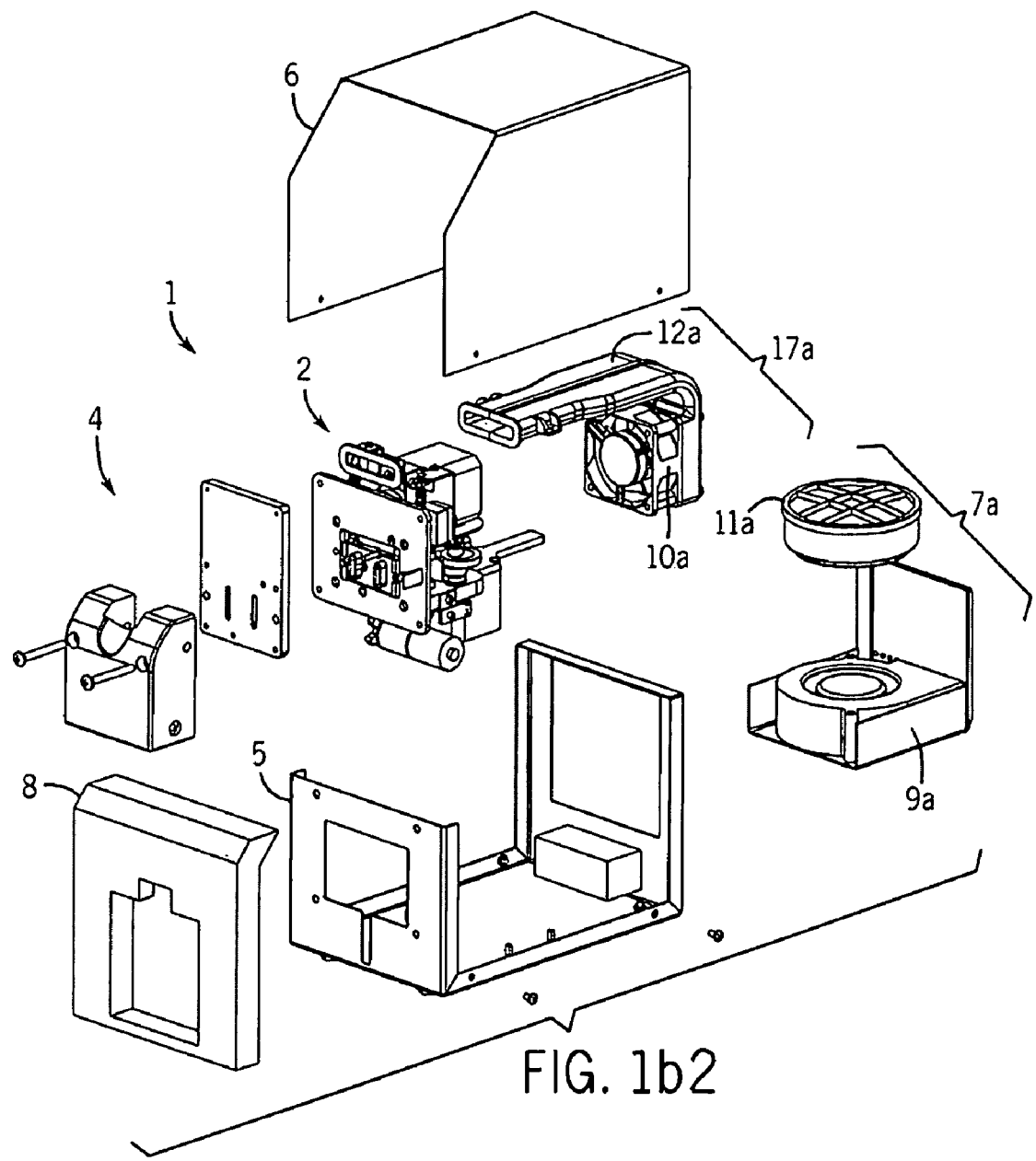
FIG. 1b2

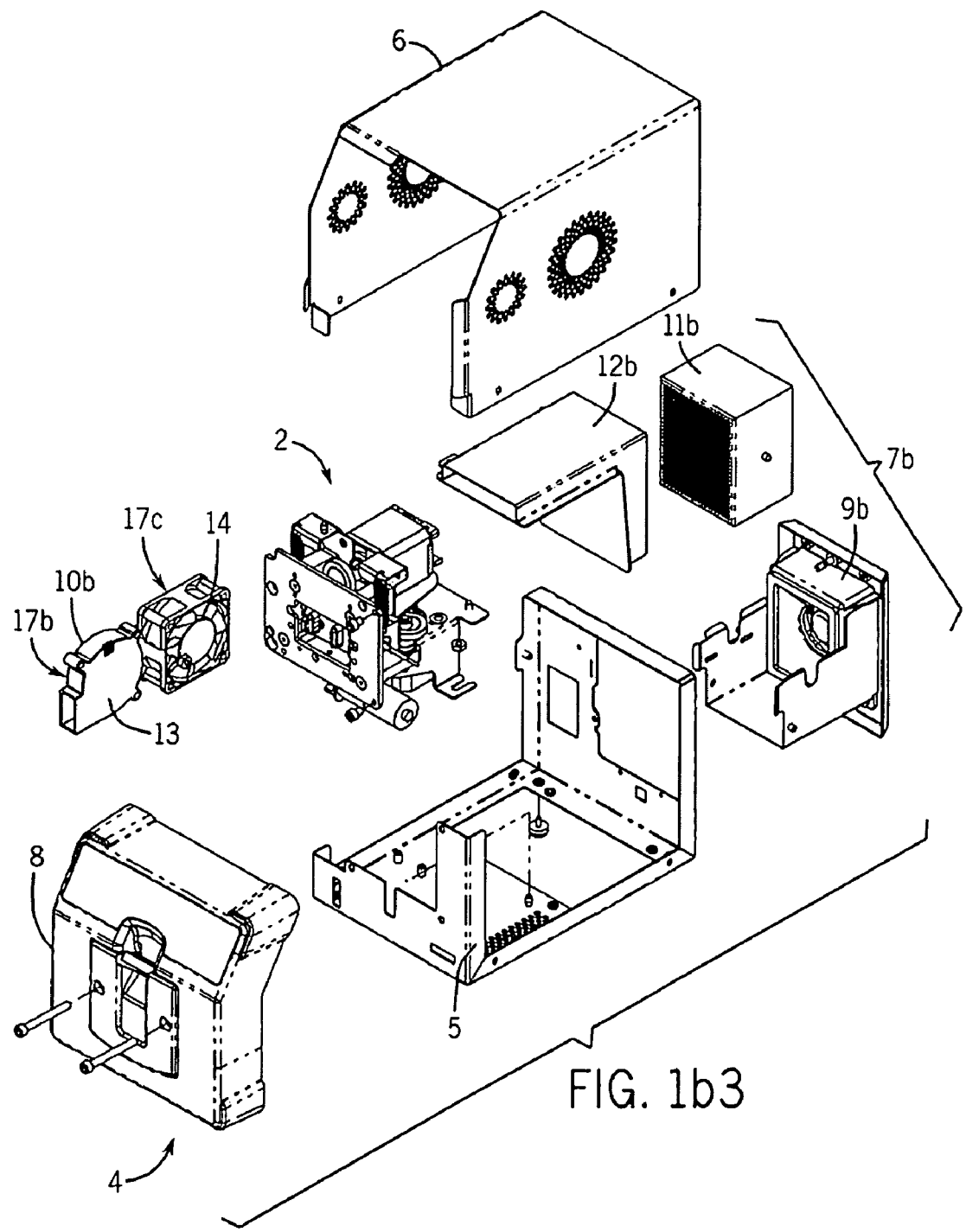
FIG. 1b3

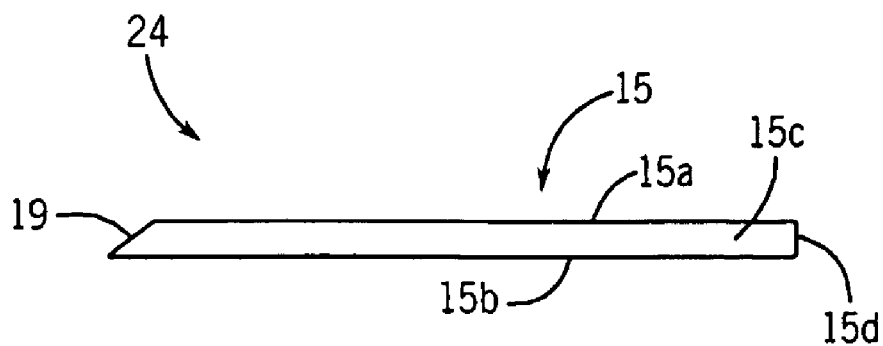
FIG. 1C1
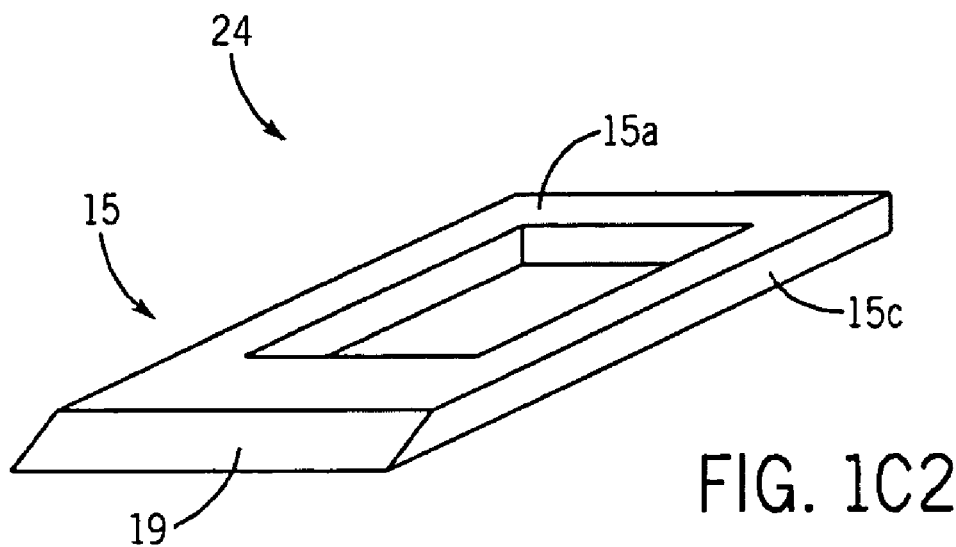
FIG. 1C2
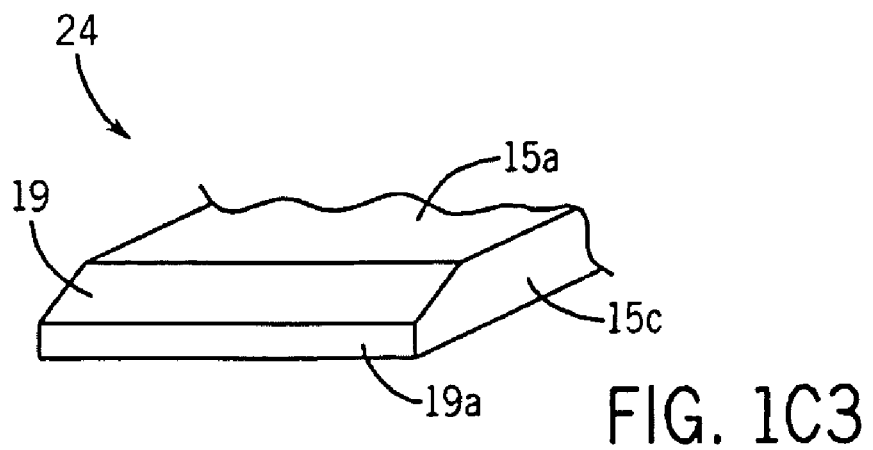
FIG. 1C3

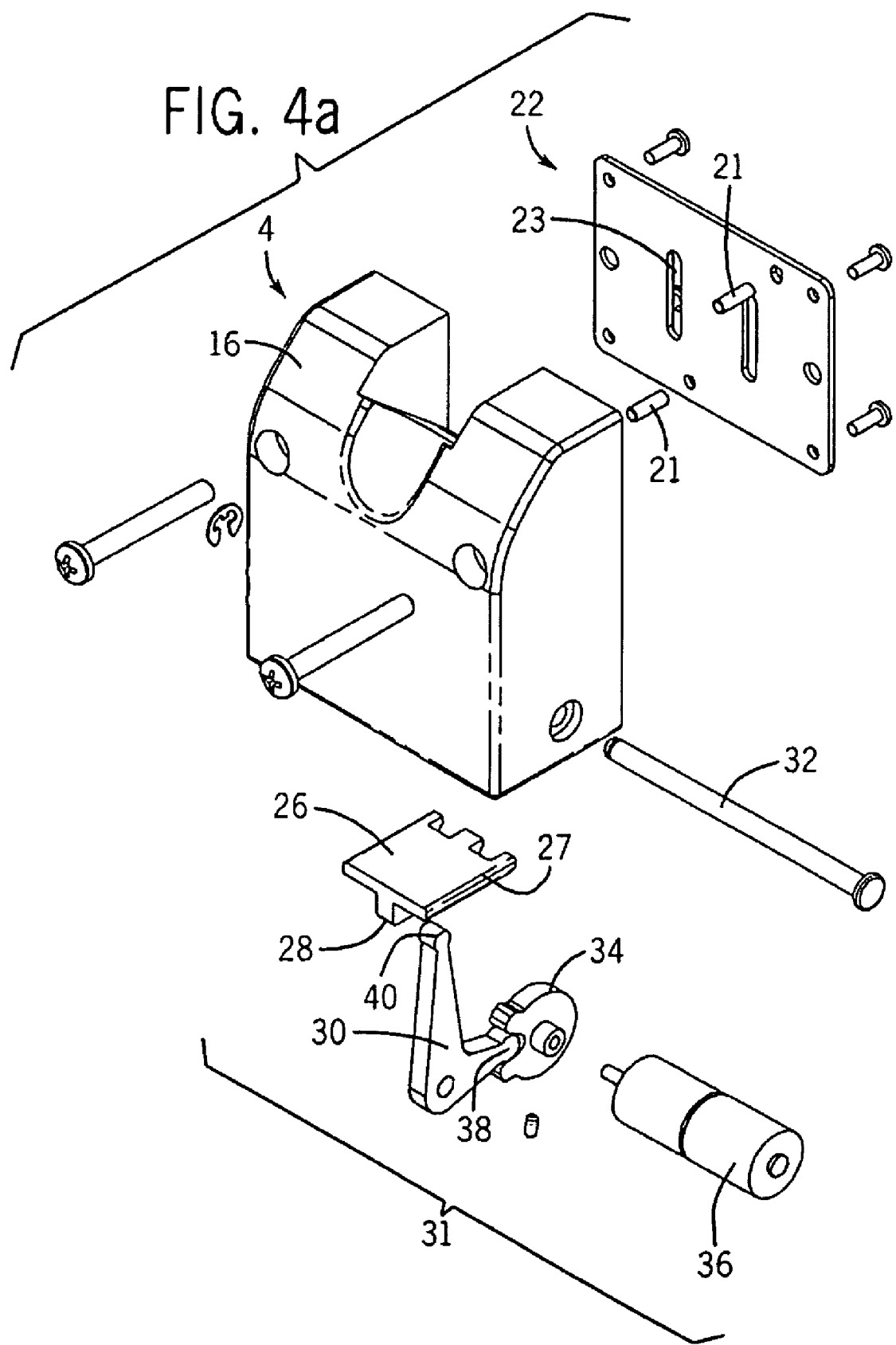

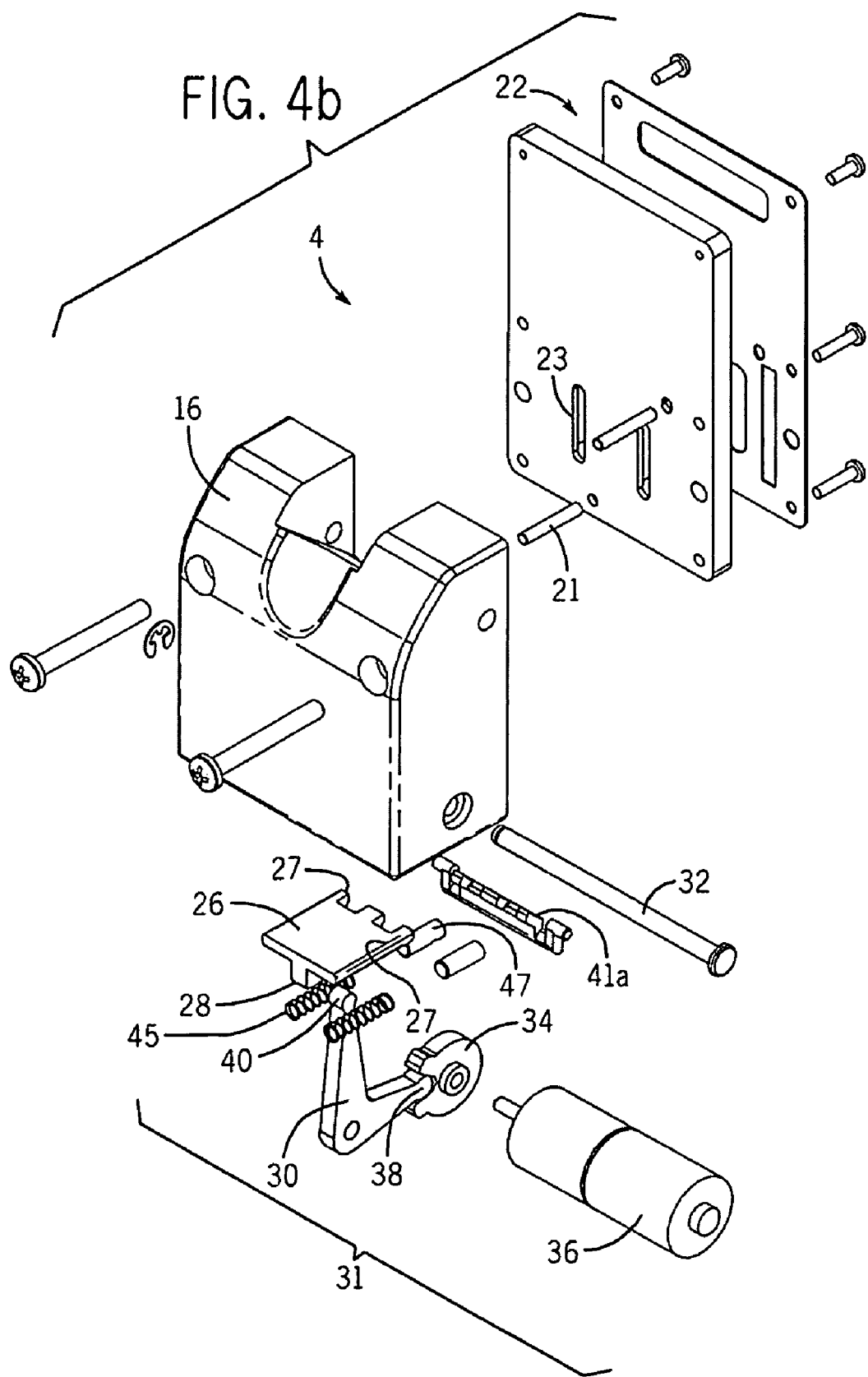

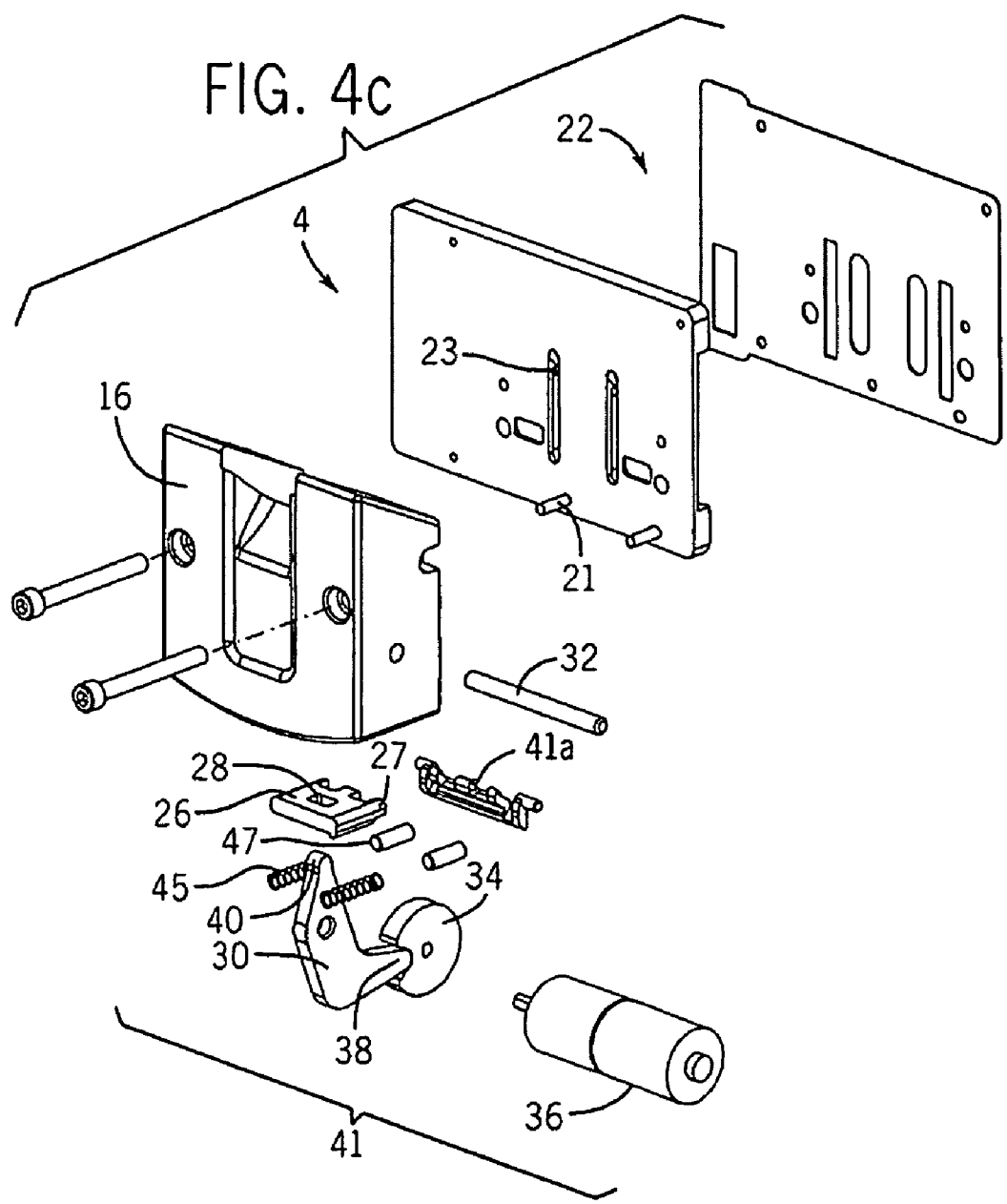

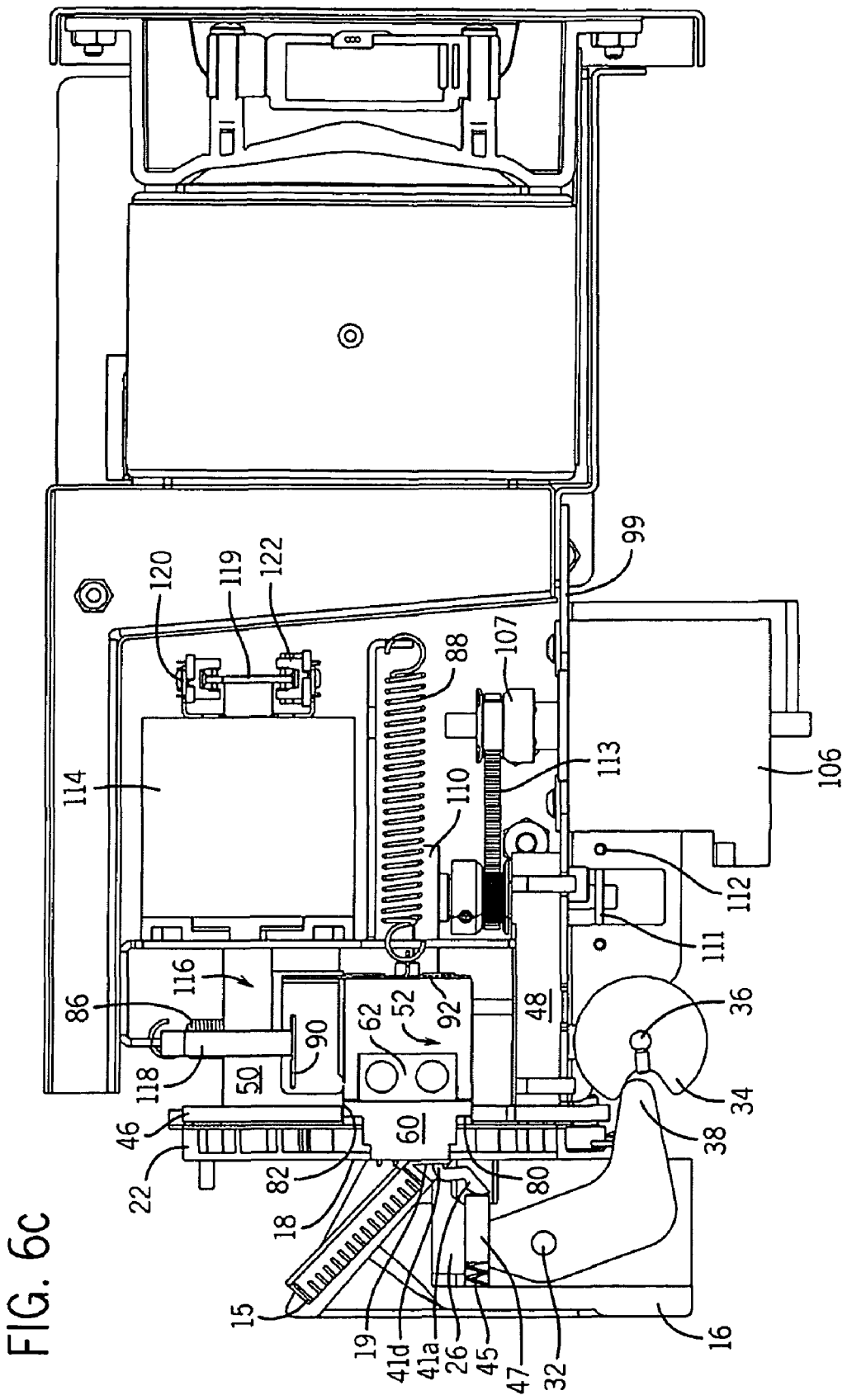

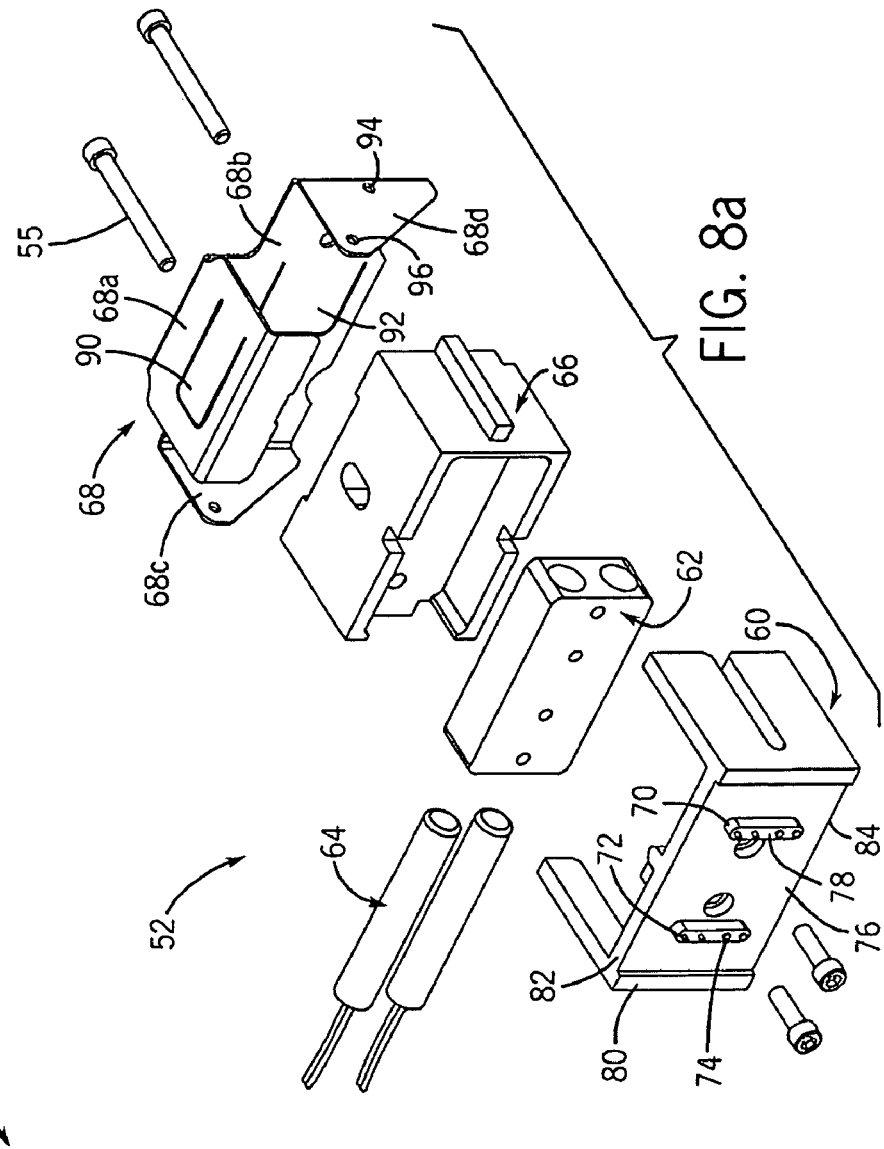
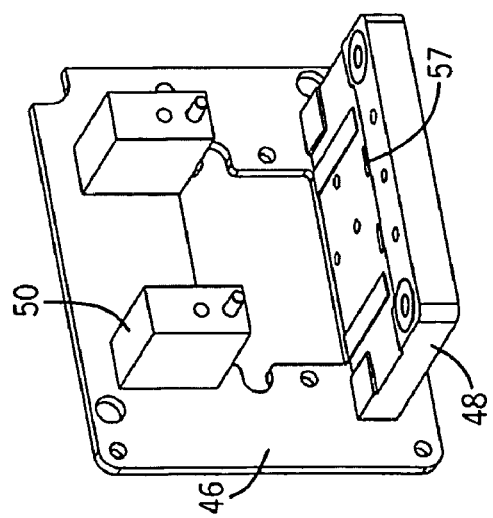

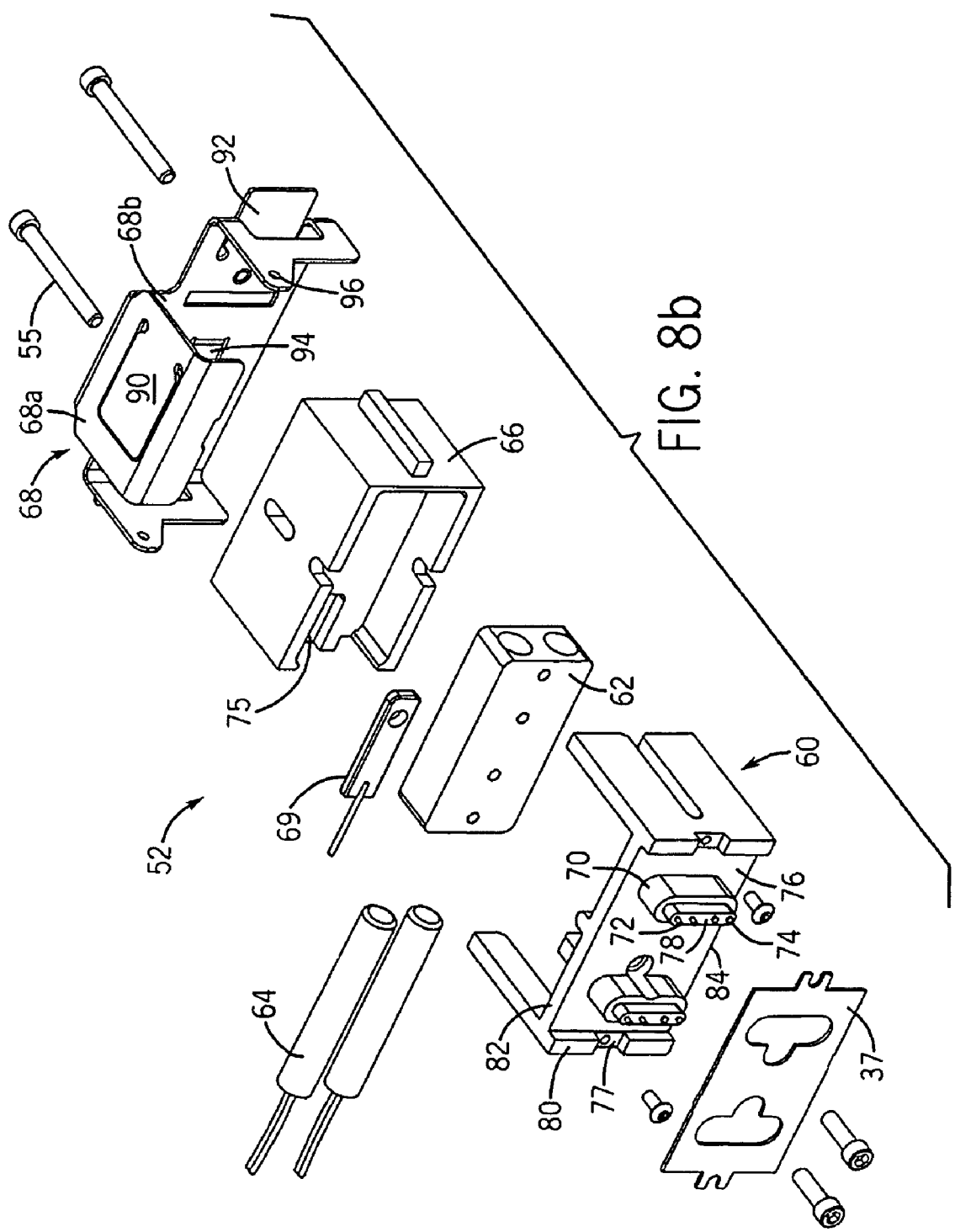

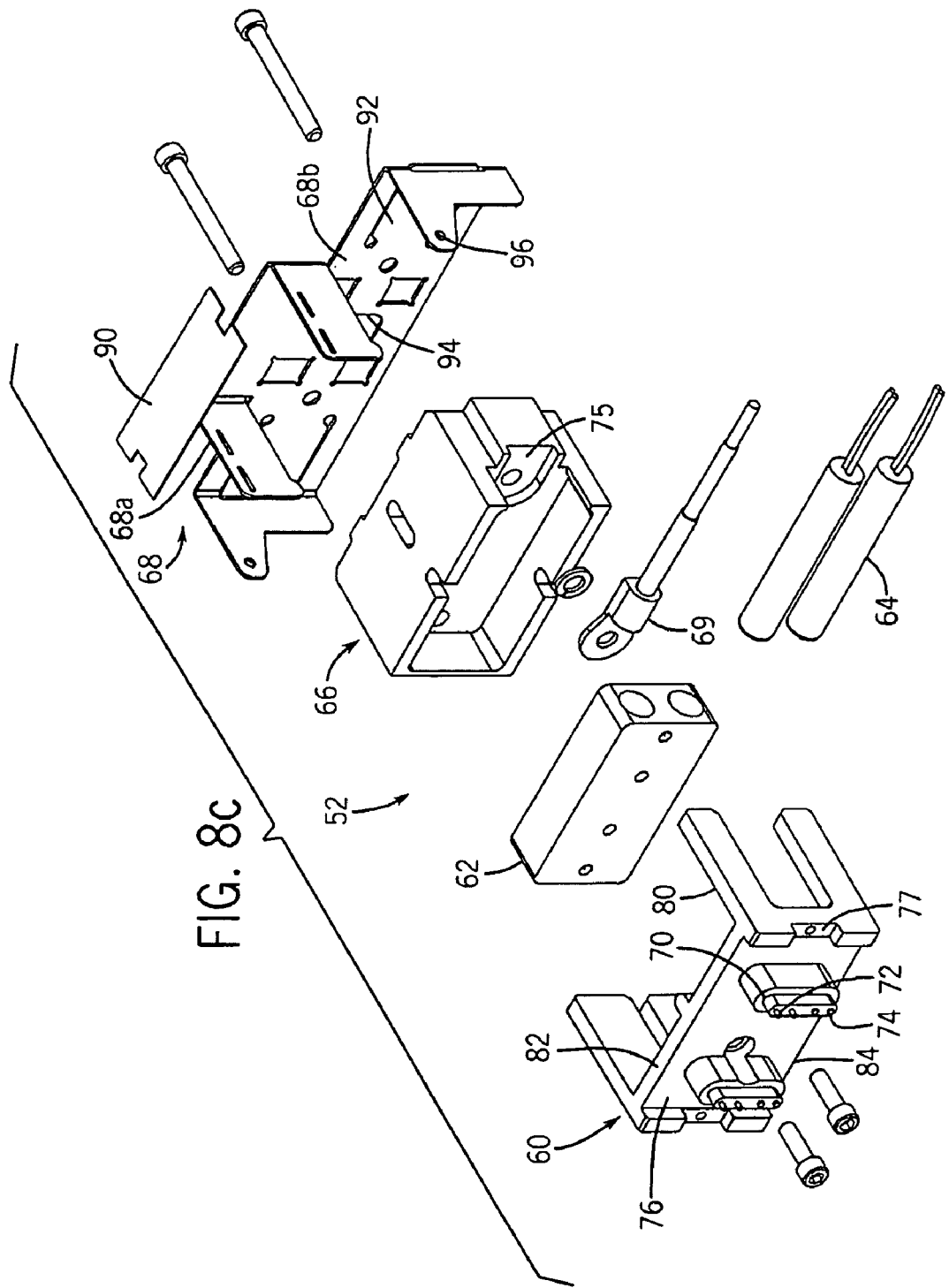

DEVICE FOR ATTACHING A LABEL TO A SUBSTRATE

CROSS-REFERENCE TO RELATED APPLICATION

This application is a continuation-in-part application of U.S. application Ser. No. 11/470,300 filed on Sep. 6, 2006 now U.S. Pat. No. 7,691,218 and claims priority to U.S. Provisional Application Ser. No. 60/986,169 filed on Nov. 7, 2007 and U.S. Provisional Application Ser. No. 61/028,647 filed on Feb. 14, 2008.

FIELD OF THE INVENTION

This invention relates to a device or machine for attaching a label to a substrate. In one aspect, the invention relates to a device for mechanically attaching a label to a substrate while in another aspect, the invention relates to a device comprising at least one heated probe and at least one cassette fixture assembly. In yet another aspect, the invention relates to a method of using the device.

BACKGROUND OF THE INVENTION

In the field of identification, labeling is commonly employed. One common form of the label consists of a (i) middle or substrate layer, e.g., film, foil, nonwoven such as Tyvek® (spun-bonded polyolefin), synthetic paper such as Valeron®, or paper, (ii) top or indicia layer providing the identification, e.g., ink, pigment, etc., and (iii) bottom or adhesive layer for attaching the label to the surface of an object. Many types of adhesives are available for use on a label, e.g., pressure-sensitive adhesives (PSAs), hot melt adhesives and the like, but PSAs are widely used because they allow fast and convenient attachment of the label to an object.

As convenient as PSA-bearing labels are, they are not without their limitations. For example, their use in harsh environments is of limited value. Under conditions of high heat (or extreme cold), elevated or reduced pressure and/or exposure to various solvents, particularly over extended periods of time, the PSA can lose its ability to bind the label to the object.

One such case is in the field of providing identification for tissue cassettes. Tissue cassettes are typically made of a thermoplastic material, and they are designed to hold biological tissue specimens while the specimen is subjected to dehydration followed by encapsulation in wax. The dehydration process requires exposure to a range of solvents such as formalin, ethanol or xylene. This is followed by embedding the dehydrated specimen in hot wax (e.g., molten paraffin). These processes can last for hours and can include exposure to heat and vacuum. Notwithstanding the wide range of PSAs available, e.g., acrylates, tackified natural and synthetic rubbers, silicones and urethanes, none have shown resistance to the complete range of conditions to which a tissue cassette is typically exposed.

As such, PSAs are generally unsuitable for reliable attachment of identification labels to tissue cassettes and, for that matter, to many consumer and industrial process containers that are also exposed to harsh environmental conditions, such as those used in the food and dairy industries, or those used for storage of hazardous materials, or those used in subzero storage (where many PSAs lose their adhesive properties). Moreover, PSAs can provide inadequate adhesion in those situations where the substrate is not exposed to harsh environmental conditions, but where the surface of the substrate is too rough or textured to allow for good adhesion between it and the label.

Aside from the various forms of adhesive attachment, various forms of mechanical attachment are known. For example, the use of staples, pins and other mechanical fasteners is common, although problematic, because the fasteners interfere with the handling of the cassette. Moreover, the design and construction of the label and substrate often do not lend themselves for use with mechanical fasteners.

BRIEF SUMMARY OF THE INVENTION

In one embodiment, the invention is a device or machine for permanently attaching a label that is provisionally attached to a substrate, particularly a label to a tissue-holding cassette. As here used, "provisionally attached" means a label that is positioned on a substrate in a manner that it is sufficiently held in place to allow the staking operation to be performed without the label shifting. Labels are traditionally affixed with the use of suitable adhesive, e.g., a pressure sensitive adhesive (PSA). "Permanently attached" means the label as affixed to the substrate after it has undergone the staking operation, and is affixed in such a manner that it cannot be removed without physically damaging the label (e.g. tearing). The device comprises a staker assembly and a cassette fixture assembly. In at least one embodiment, the staker assembly comprises (i) a probe plate, (ii) a backstop, (iii) a block assembly, (iv) a lower rotation assembly, and (v) an upper rotation assembly. The block assembly comprises (vi) a probe block which itself comprises (vi-a) a burn probe, and (vi-b) a plunge probe, (vii) a heater block, (viii) a carrier, and (ix) a spring plate. The cassette fixture assembly comprises (x) a cassette fixture, (xi) a fixture plate, and (xii) a clamping assembly. In at least one embodiment, the clamping assembly comprises (xiii) a fixture clamp, (xiv) a clamp lever, (xv) a clamp cam, (xvi) a clamp motor, and (xvii) a fixture pin. In at least one embodiment, the staker assembly further includes at least one of a fan, a cooling mechanism and a fuming mechanism. In another embodiment, the clamping assembly further comprises a pivot arm.

In the provisional attachment of a label to a cassette or other substrate, the label is pre-positioned on the cassette using a suitable adhesive, e.g., a PSA. The cassette is inserted into the slot of the cassette fixture either manually or by automated means, such that the front edge of the label-bearing face of the cassette is in contact with the forward face of the fixture plate. The cassette is then locked into place using the clamping assembly by activating the fixture clamp such that the label-bearing face of the cassette is pressed against the forward face fixture plate. The burn probe and plunge probe are situated to extend from a probe stand and are preheated to the required temperature. After the label is in secured contact with the fixture plate, then the heated burn probe is brought into contact with the label such that a hole is burned through the label. The burn probe is then retracted, and the plunge probe is advanced through the hole in the label. The plunge probe is smaller in cross-section and longer in length than the burn probe. The plunge probe is advanced into the cassette such that a portion of the cassette is melted and is displaced through the hole and against a shoulder surface that extends beyond the cross-section of the plunge probe and cross-section of the hole, onto the surface of the label. Upon removal of the plunge probe, the melted, displaced substrate solidifies on the label in the form of a collar bond which securely attaches the label to the cassette. The cassette is then released from the fixture clamp and removed from the device.

BRIEF DESCRIPTION OF THE DRAWINGS

FIG. 1a1 is an exemplary front perspective view of at least one embodiment of a device for staking labels.

FIG. 1a2 is an exemplary back perspective view of the staking device of FIG. 1a1.

FIG. 1b1 is a semi-exploded perspective view of the staking device.

FIG. 1b2 is a semi-exploded perspective view of an alternate embodiment of FIG. 1b1.

FIG. 1b3 is a semi-exploded perspective view of another alternate embodiment of FIG. 1b1.

FIGS. 1c1 and 1c2 are side and perspective views of an exemplary tissue cassette 15 that may be used with the staking device.

FIG. 1c3 is a front perspective view of an alternate embodiment of the label-bearing face 19 of FIG. 1c2.

FIG. 4a is an exploded perspective view of the cassette fixture assembly 4 of FIG. 2a.

FIG. 4b is an exploded perspective view of the cassette fixture assembly 4 of FIG. 2b.

FIG. 4c is an exploded perspective view of the cassette fixture assembly 4 of FIG. 2c.

FIG. 6c is a cross-sectional view of the staking device of FIG. 2c in a burn position.

FIG. 7a is a perspective view of the probe plate 44 of FIG. 2c.

FIG. 8a is an exploded view of the block assembly 52 of FIG. 2a.

FIG. 8b is an exploded view of the block assembly 52 of FIG. 2b.

FIG. 8c is an exploded view of the block assembly 52 of FIG. 2c.

FIG. 10a is an exploded view of a lower rotation assembly 56 of FIG. 2a.

DESCRIPTION OF THE PREFERRED EMBODIMENTS

Staking device 1, as shown in FIGS. 1a1 and 1a2, is described in terms of permanently attaching a thermoplastic label that has been provisionally attached to a tissue cassette made of thermoplastic material. Those skilled in the art understand that various modifications to the device can be made to accommodate labels and substrates comprising other materials and designs. Various items of equipment such as electrical connections, circuit boards, power supplies, fittings and the like have been selectively omitted so as to simplify the drawings. The following description does not limit the scope of the device, but particularly points out several embodiments. Additionally, like numerals have been used to identify like parts throughout.

Figure 12A:
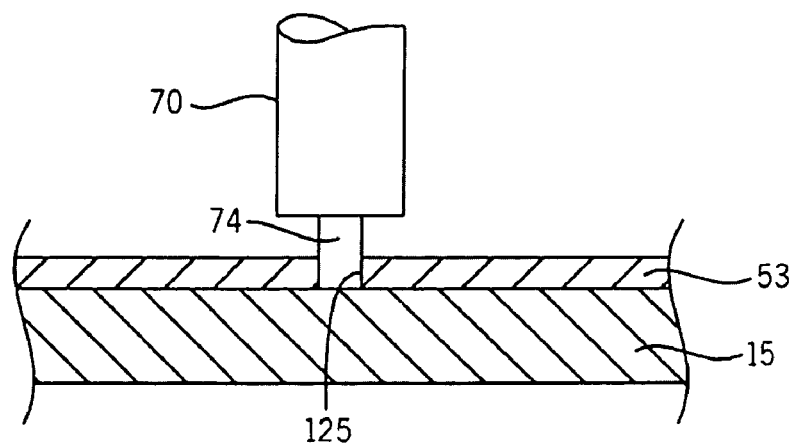
FIG. 12a is a cross-section view of an exemplary burn probe 74 forming a label aperture 125 in a label 53.
Figure 12B:
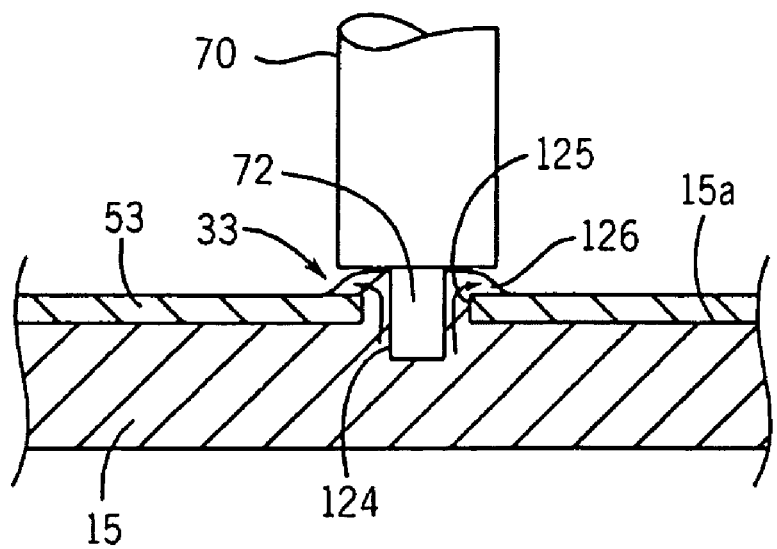
FIG. 12b is a cross-section view of an exemplary plunge probe 72 forming an exemplary collar bond 33.
Figure 12C:
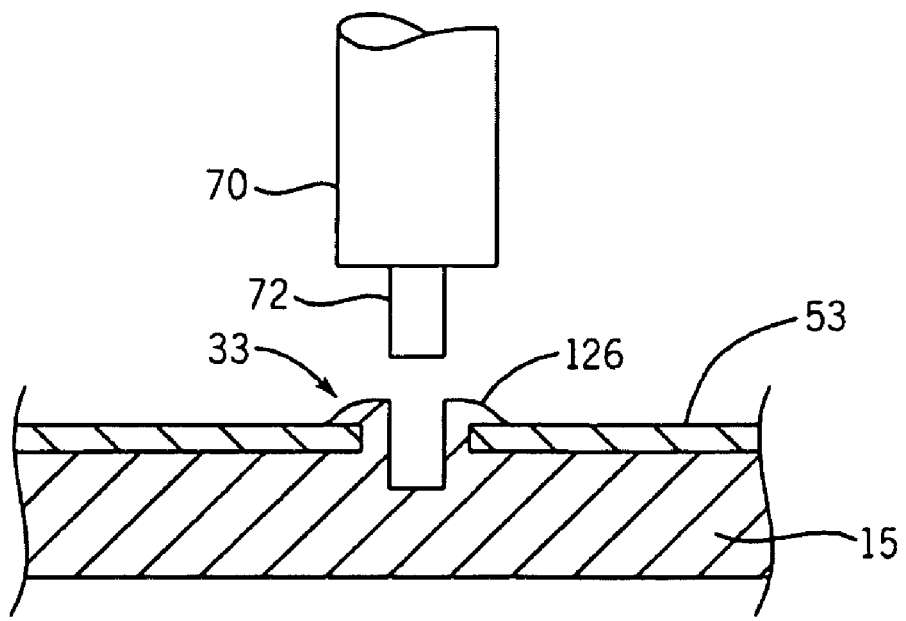
FIG. 12c is a cross-section view of the collar bond 33 of FIG. 12b, that is fully formed to permanently attach the label 53 to the label-bearing face 19 of the tissue cassette 15.

The staking device 1 creates a collar bond 33 that bonds a label 53 to a label-bearing face 19 of a substrate 24 (see FIG. 12c). The collar bond 33 as referenced in this application is defined as a substrate 24 that has been melted and displaced onto the surface of the label 53 and re-solidified such that it is continuous with the underlying substrate 24. The term "collar bond" is not intended to be limited in size or shape although in the embodiment described below the collar bond 33 is collar shaped.

FIGS. 1a1 and 1a2 depict one embodiment of the staking device 1 in a fully assembled form. FIG. 1b1 depicts an exploded view of at least one embodiment of the staking device 1 in FIG. 1a1, comprising a staker assembly 2, a cassette fixture assembly 4, a base 5, a top cover 6 and a front cover 8. An exemplary fuming mechanism 7a, such as a blower 9a and a filter 11a may be removably mounted in the rear portion of the base 5, to cool the device and/or to vent any harmful fumes from the staking device 1 created by the staking process. Referring to FIG. 1b2, another embodiment of the staking device 1 is shown with an exemplary cooling mechanism 17a, such as cooling fan 10a and a fan duct 12a connected to the staker assembly 2 for cooling at least a portion of the cassette fixture assembly 4. In reference to FIG. 1b3, an alternate embodiment of the staking device 1 is shown that includes one embodiment of the fuming mechanism 7b that includes a fuming blower 9b, a filter 11b and a fan duct 12b, configured to filter and vent fumes produced by the staking process adjacent the cassette fixture assembly 4. Additionally, FIG. 1b3 includes one embodiment of the cooling mechanism 17b that includes a cooling fan 10b having a flow duct 13 for directing outside air to at least a portion of the cassette fixture assembly 4, and another cooling mechanism 17c that includes at least a device fan 14 for venting the inside of the staking device 1 by pulling outside air through one side of the top cover 6 and exhausting it out the other side. In at least some embodiments, the fuming mechanism 7a, 7b and/ or cooling mechanism 17a, 17b, 17c may include isolating barriers (not shown) to vent direct or indirect fumes/air to a location remote from the user.

FIGS. 1c1 and 1c2 depict at least one embodiment of a substrate 24, namely an exemplary tissue-sampling cassette 15, as discussed in this application. Cassette 15 as shown in these Figures includes a cassette top face 15a, a cassette bottom face 15b, a pair of cassette side faces 15c, a cassette back face 15d, and a label-bearing face 19. Tissue-sampling cassettes 15 come in various sizes and shapes, and an ordinary person skilled in the art can modify this device to any shape or size. An alternate cassette front is depicted in 1c3 having a label-bearing face 19 with an adjacent beveled face 19a. A typical tissue cassette 15 is flat on the bottom with a label-bearing face 19 that is situated at approximately a 45-degree angle from the bottom. The angle of the label-bearing face 19 relative to the cassette bottom face 15b can vary substantially without effect, as the cassette fixture assembly 4 compensates for various angles. Although the discussed embodiment references a thermoplastic cassette material, the cassette 15 may be of any material that would melt and displace to form a collar bond 33 when in contact with the heated plunge probe 72.

Figure 2A:
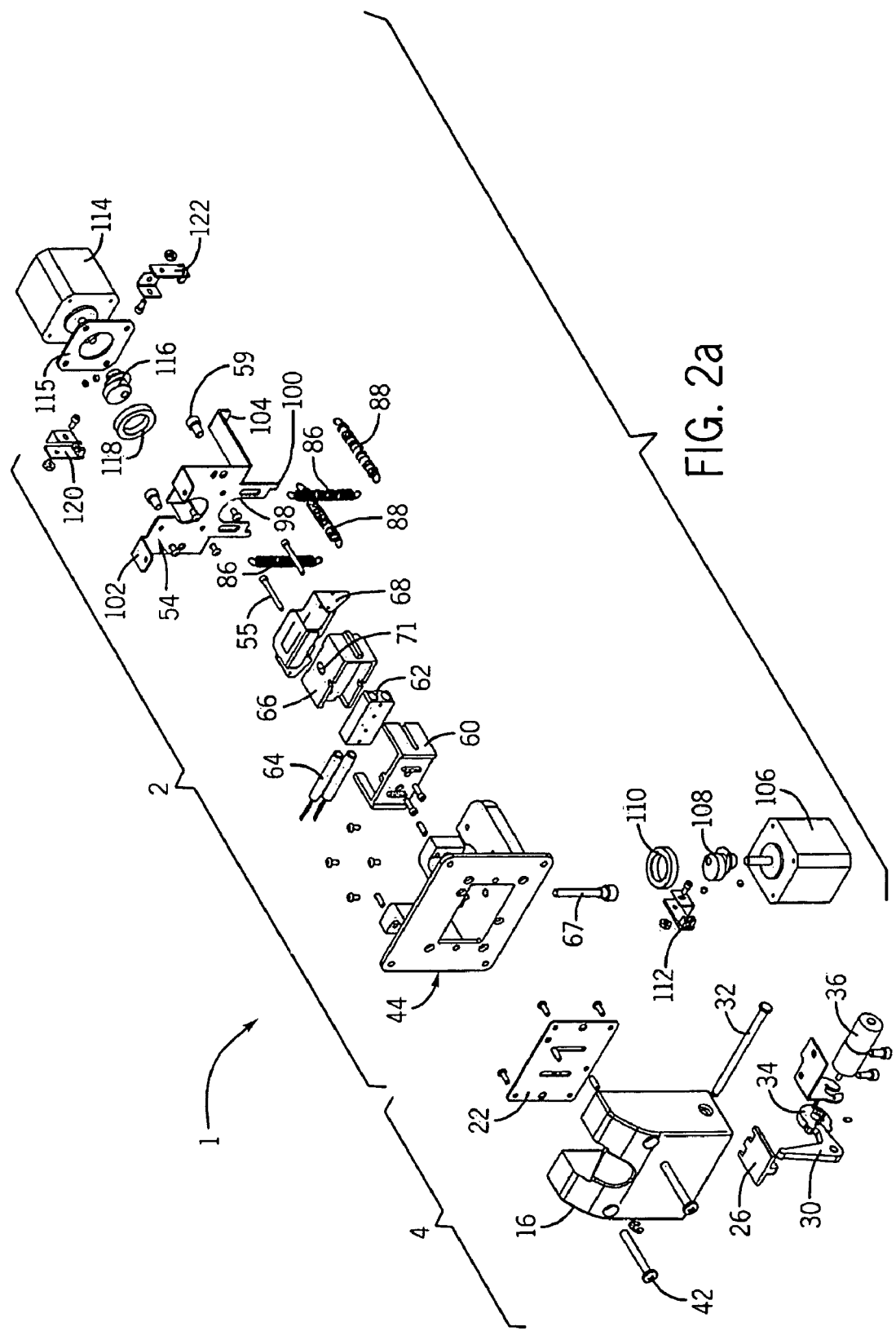
FIG. 2a is an exploded perspective view of the staking device of FIG. 1b1.
Figure 2B:
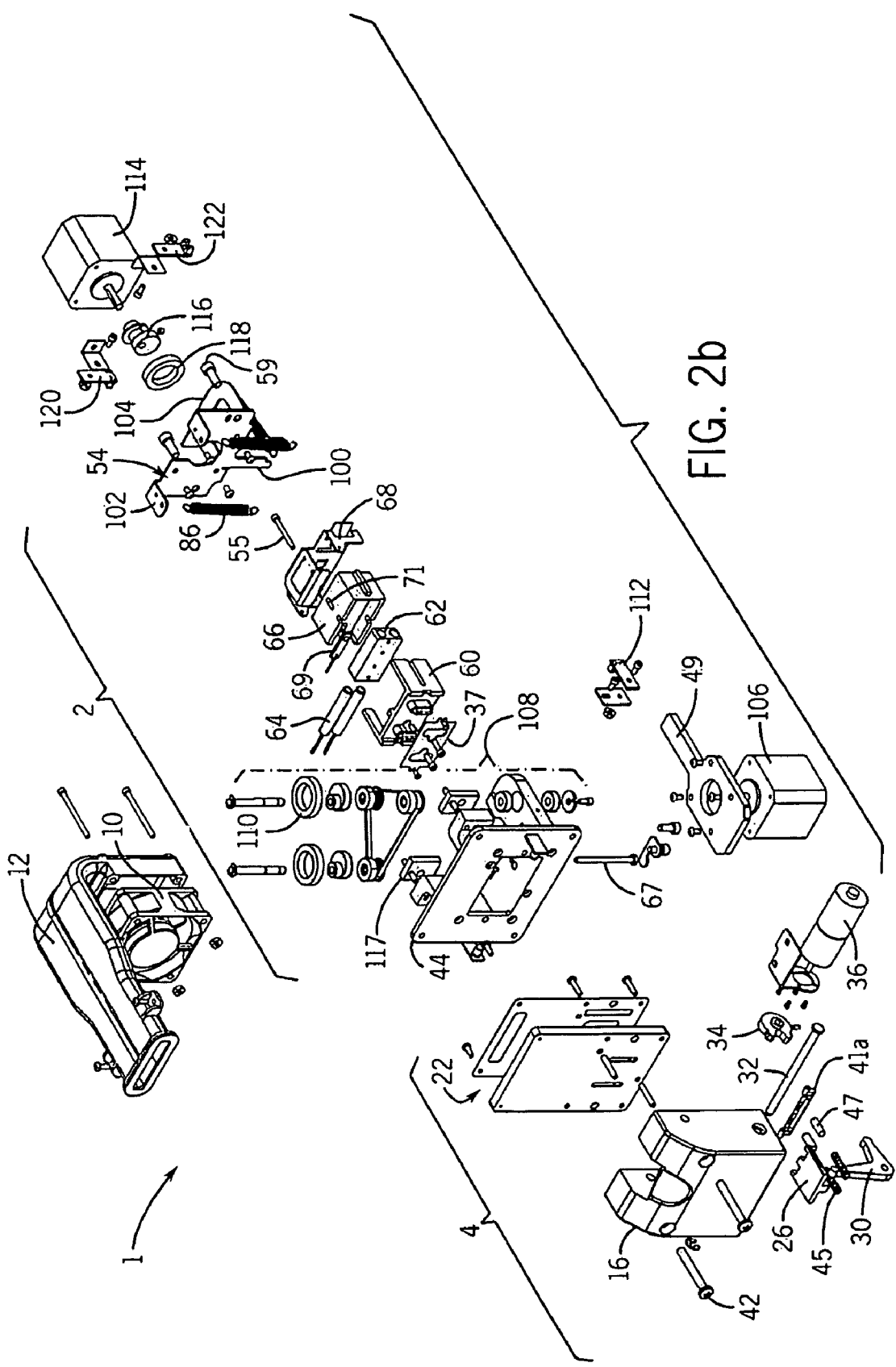
FIG. 2b is an exploded perspective view of the staking device of FIG. 1b2.
Figure 2C:
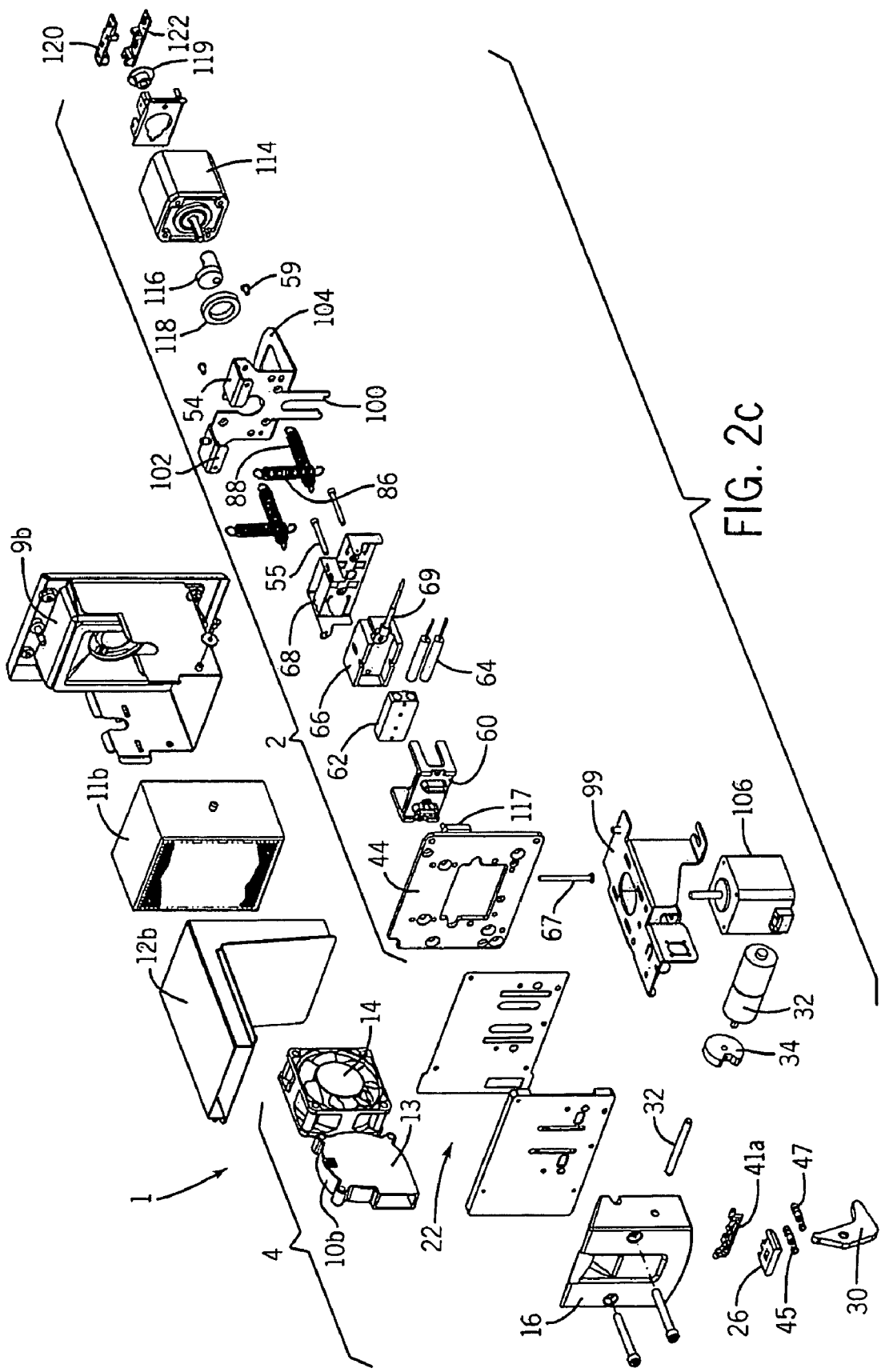
FIG. 2c is an exploded perspective view of the staking device of FIG. 1b3.
Figure 3A:
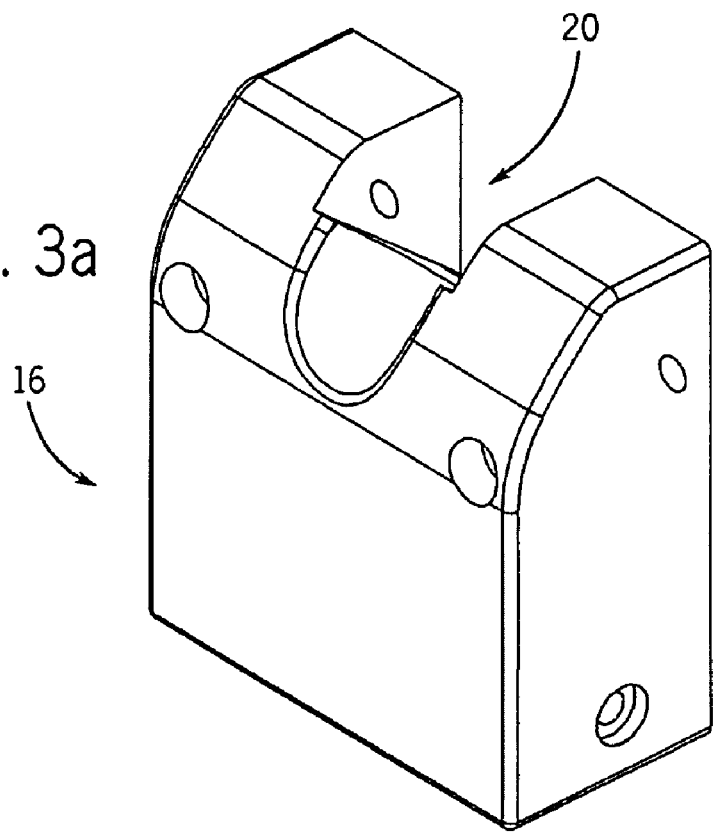
FIGS. 3a and 3b are perspective views of an exemplary cassette fixture 16.
Figure 3B:
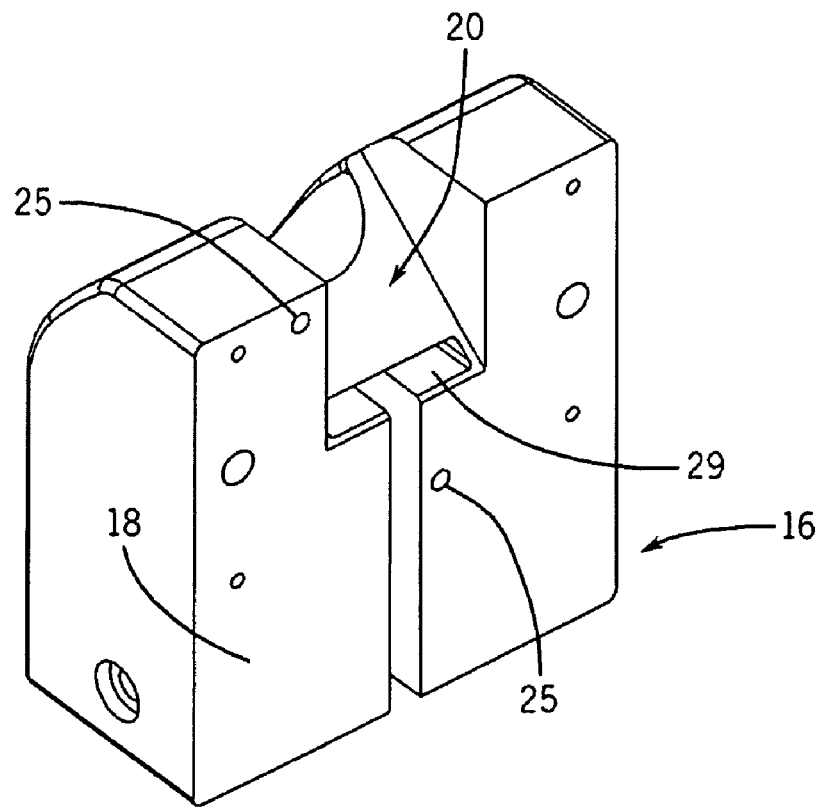

Referring to FIG. 2a, in at least one embodiment the components of the staker assembly 2 and the cassette fixture assembly 4 are depicted in an exploded format. Alternate embodiments of the components of the staker assembly 2 and the cassette fixture assembly 4 are shown in FIGS. 2b and 2c in an exploded format. The cassette fixture assembly 4 is designed to accommodate and secure a tissue sample cassette 15. The cassette fixture assembly 4 includes in at least one embodiment a cassette fixture 16, as seen in FIGS. 3a and 3b, which is made from a material that dissipates heat well, such as aluminum. Referring to FIGS. 3a and 3b, the cassette fixture 16 has a cassette slot 20 situated near its top, and a cassette fixture face 18 that is directed towards the staker assembly 2. The cassette slot 20 is shaped to accommodate the cassette 15 as substantially depicted in FIGS. 1c1-1c3; the slot 20 has a width marginally larger than the width of the cassette 15 such that the slot 20 provides self-centering of the cassette 15. Further, in at least one alternate embodiment not shown, the cassette fixture 16 has a slot that may be adjusted in width, allowing the slot to accommodate various-sized cassettes 15. Additionally, in another alternate embodiment (not shown), the cassette fixture 16 is removable and replaceable with other cassette fixtures 16 each having different slot dimensions.

Figure 3C:
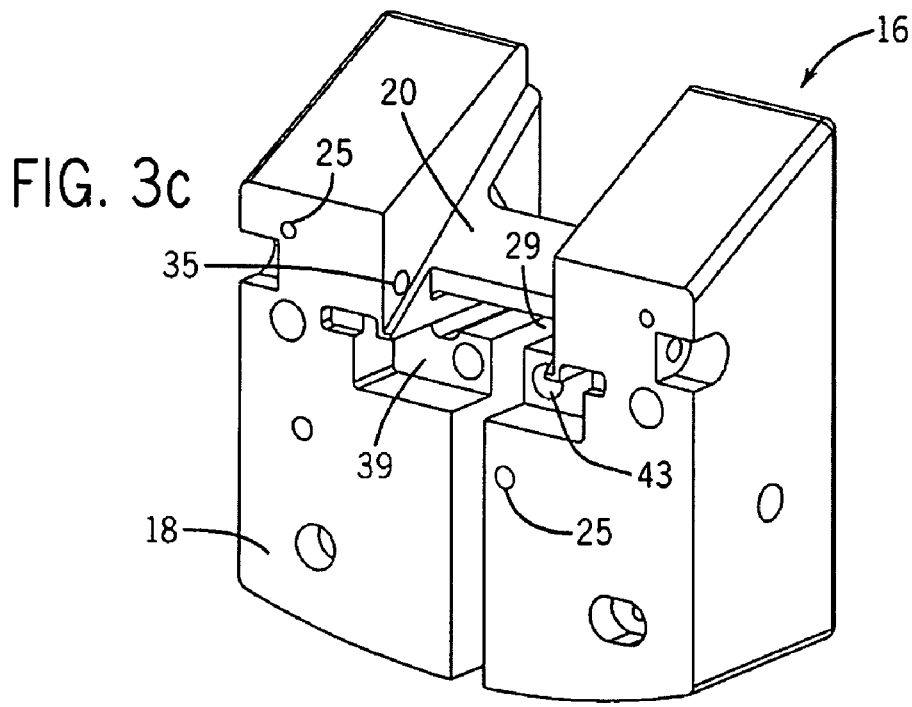
FIGS. 3c and 3d are perspective views of alternate embodiments of FIGS. 3a and 3b, respectively.
Figure 3D:
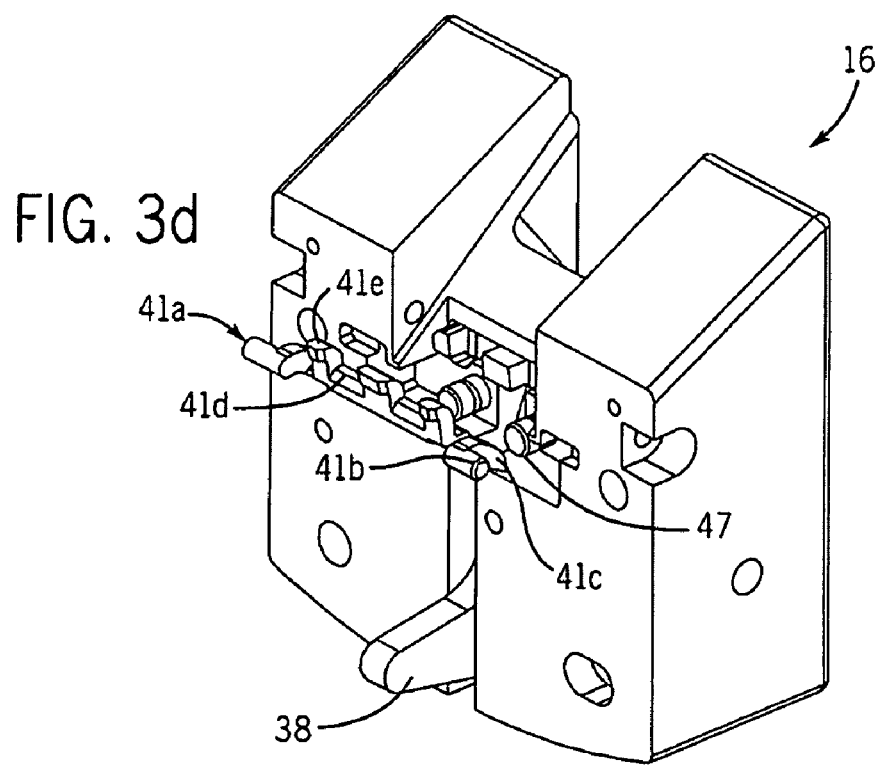

In another embodiment, referring to FIGS. 3c and 3d, the cassette fixture 16 further includes a pivot arm depression 39 (FIG. 3c) extending from the cassette fixture face 18 inward, with a pivot arm 41a as shown in FIG. 3d situated at least partially inside the pivot arm depression 39. Further referring to FIG. 3d, the pivot arm 41a is comprised of a hinge mechanism 41b, a lower portion 41c, and an upper portion 41d having pivot tabs 41e. Further, at least one pivot spring hole 43, as seen in FIG. 3c, extends from the pivot arm depression 39 inward, whereby a pivot spring 45 and spring cap 47 are situated within (best seen in FIGS. 4b, 4c, 5b and 5c). The pivot spring 45 provides a pushing force against the lower portion 41c away from the pivot arm depression 39. Additionally, in at least one embodiment, the cassette fixture 16 may include a cassette sensor 35, such as an infra-red sensor, to sense when a cassette 15 is situated in the cassette slot 20.

In reference to FIGS. 4a-4c, in at least one embodiment, cassette fixture assembly 4 further includes a fixture plate 22. As the cassette slot 20 is preferably angled downward towards the cassette fixture face 18, the downward angle provides a biasing position to hold the cassette 15 adjacent to the fixture plate 22. The fixture plate 22 is affixed to the cassette fixture face 18 such that when a cassette 15 is inserted in the cassette slot 20 with the cassette bottom 15b against the bottom of the cassette slot 20, the front edge of the label-bearing face 19 at least partially abuts the fixture plate 22 (shown in position in FIGS. 5a, 5b and 5c). Additionally, the fixture plate 22 has a pair of fixture plate slots 23 in a vertical orientation (FIGS. 4a-4c). To provide precise alignment tolerances, it is preferable that the fixture plate 22 has a pair of dowels 21 (FIGS. 4a, 4b and 4c) that engage a pair of mating holes 25 in the cassette fixture face 18 (FIGS. 3b, and 3c), although other means of alignment could be used.

Figure 4D:
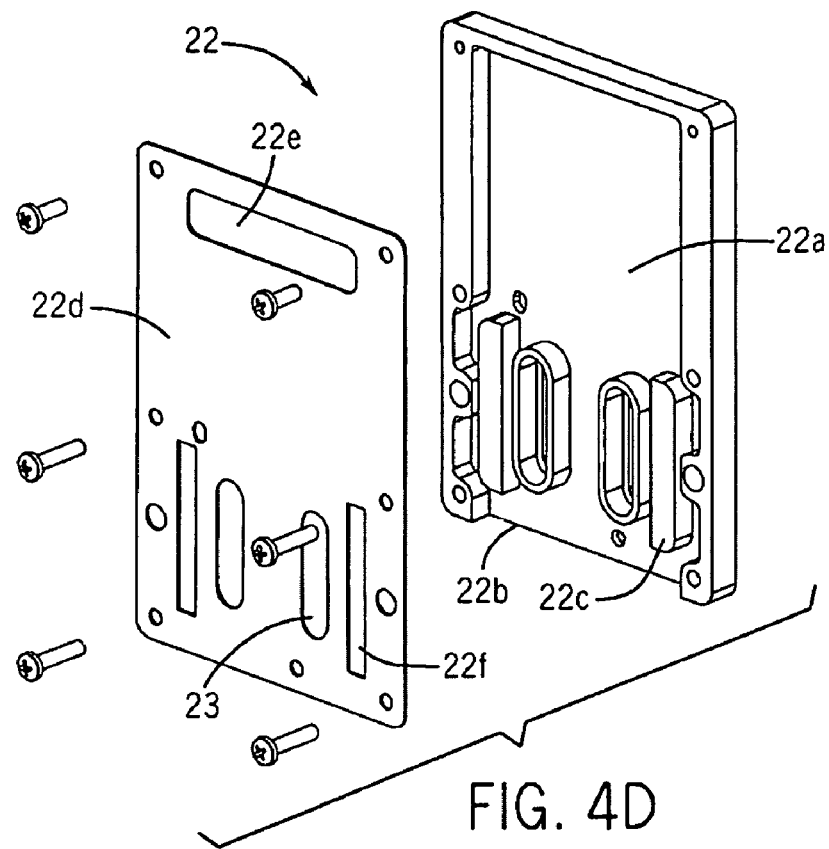
FIG. 4d is an exploded perspective view of the fixture plate 22 of FIG. 2b.
Figure 4E:
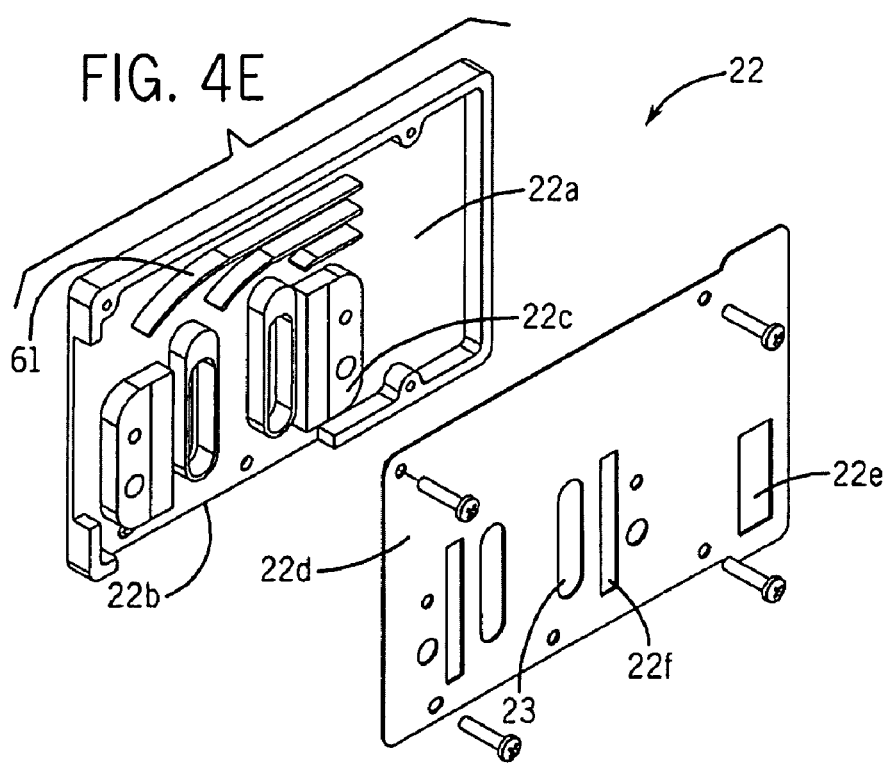
FIG. 4e is an exploded perspective view of the fixture plate 22 of FIG. 2c.
Figure 5A:
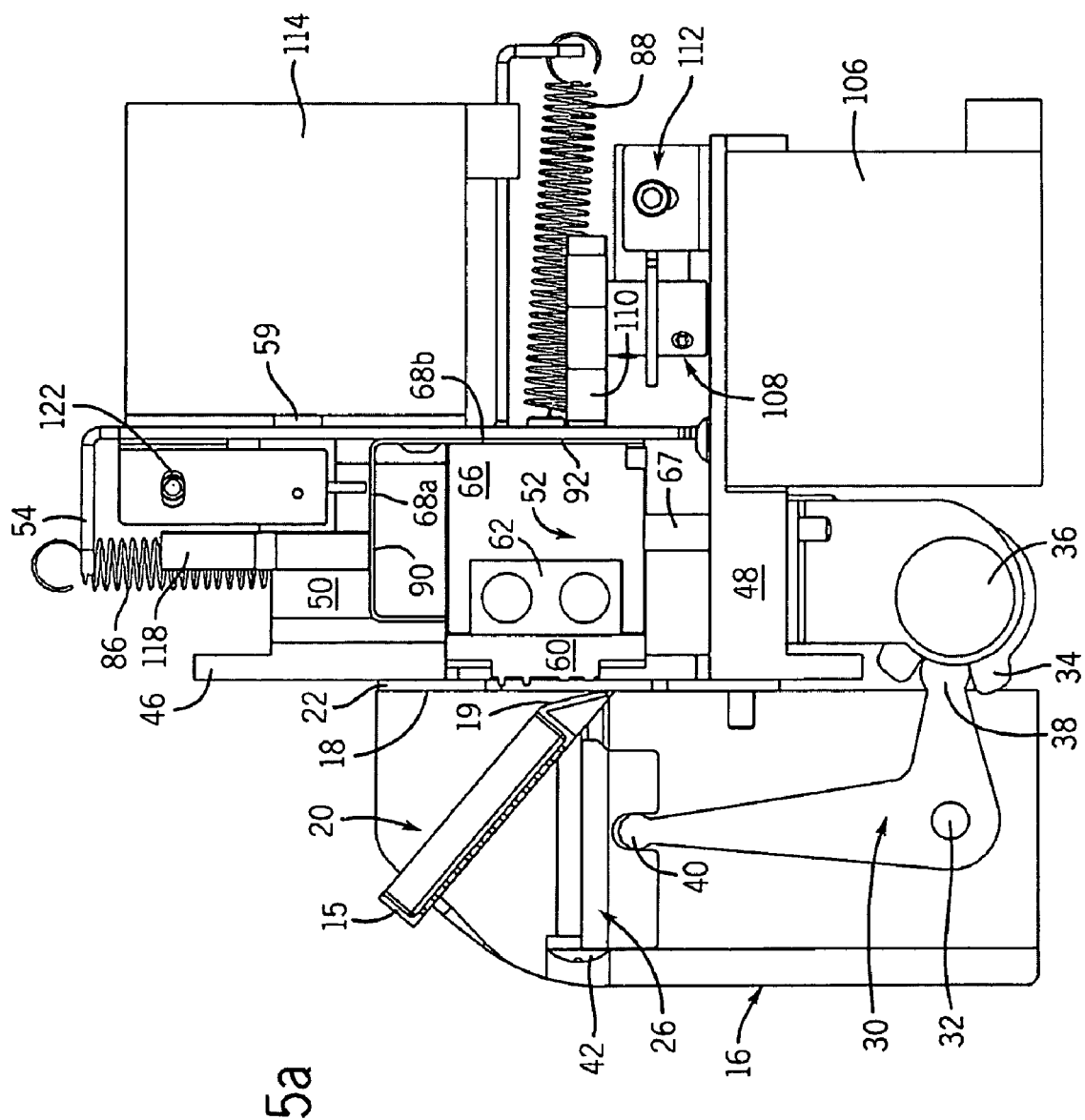
FIG. 5a is a cross-sectional view of the staking device of FIG. 2a in a default position.
Figure 5B:
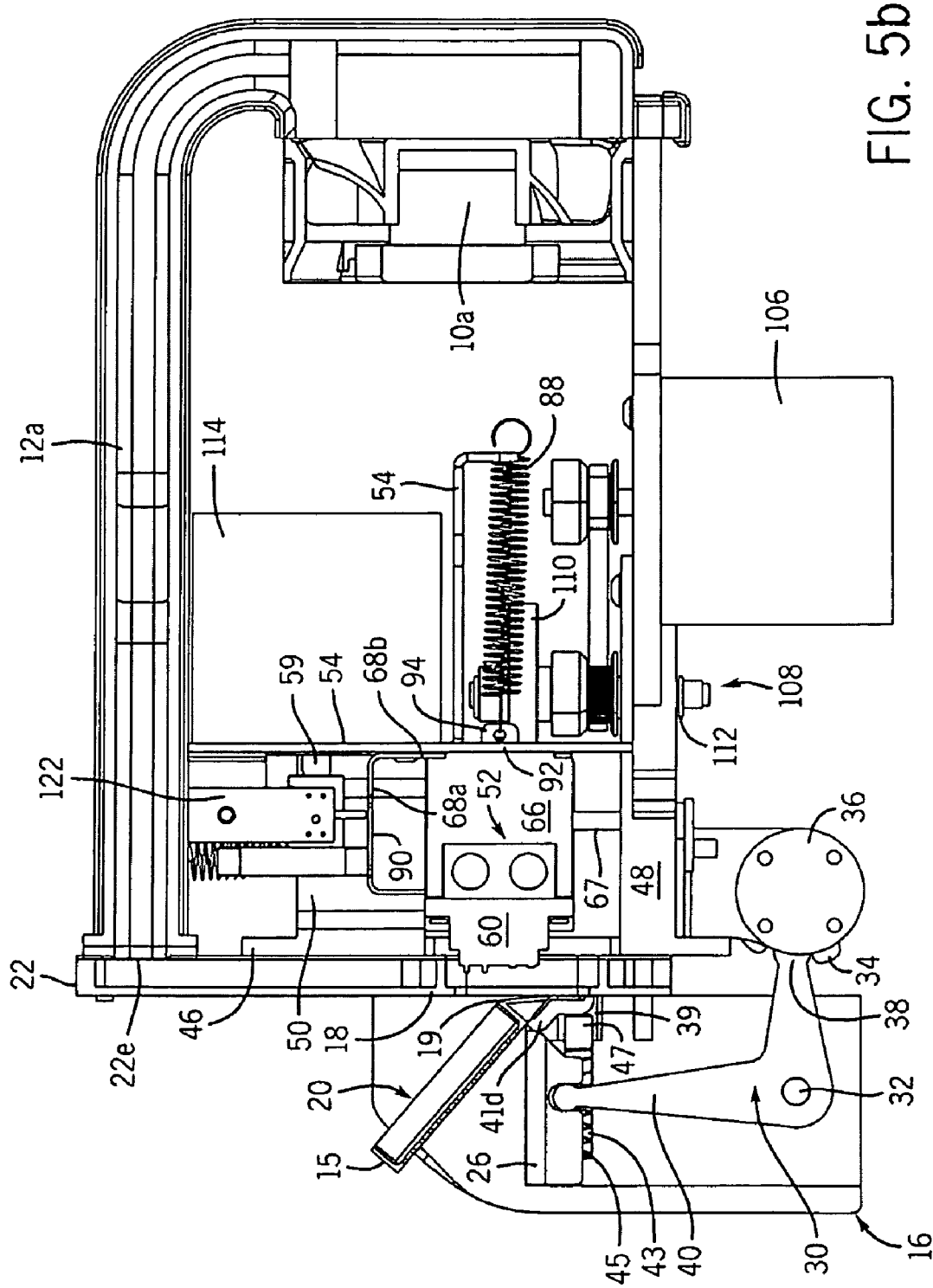
FIG. 5b is a cross-sectional view of the staking device of FIG. 2b in a default position.

Referring to FIG. 4d, in at least one embodiment, the fixture plate 22 includes a plate channel 22a that extends from a bottom opening 22b upwards around at least one fixture plate slot 23 and at least one probe spacer stop 22c. Additionally, the back portion 22d of the fixture plate 22 further includes an air draw vent 22e and at least one probe spacer stop opening 22f. Further, the air draw vent 22e is in communication with the fan duct 12a which is connected to the cooling fan 10a as shown in FIG. 5b. The cooling fan 10a may be operated to cool the interface between the staker assembly 2 and the cassette fixture assembly 4 during the staking process by pulling air up through the fixture plate 22 and exhausting it either inside or outside the staking device 1. Further, an alternate embodiment of the fixture plate 22 is shown in FIG. 4e, where the cooling fan 10b pushes outside air through the flow duct 13 (as seen in FIG. 1b3) and into the air draw vent 22e. The outside air is guided across the fixture plate 22 by one or more flow vanes 61.

Figure 5C:
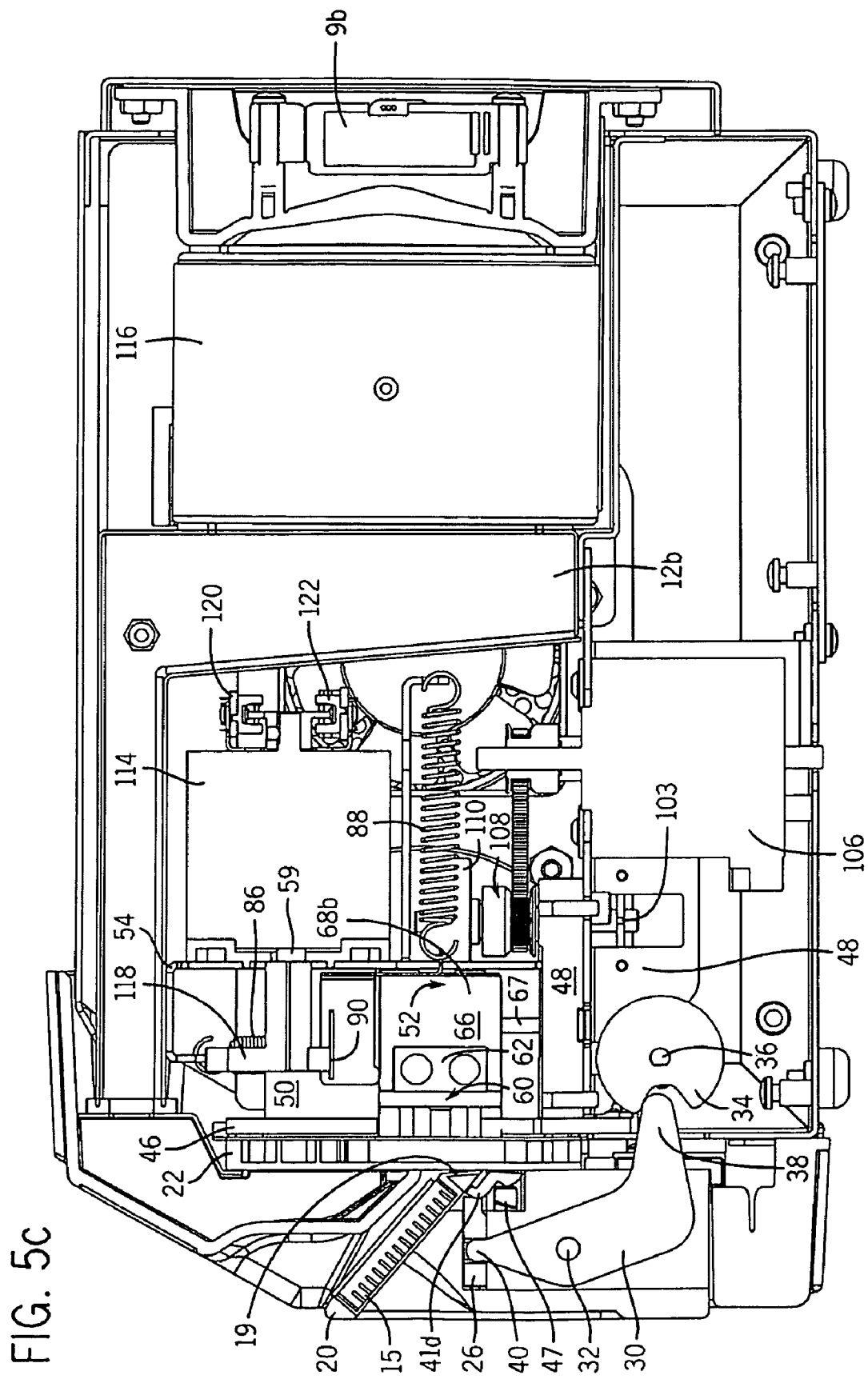
FIG. 5c is a cross-sectional view of the staking device of FIG. 2c in a default position.

Referring to FIGS. 4a and 4b, the cassette fixture assembly 4 includes a clamping assembly 31 having a fixture clamp 26, a clamp lever 30, a clamp cam 34, a clamp motor 36, and a fixture pin 32. The clamping assembly 31 in another embodiment further includes the pivot arm 41a. The fixture clamp 26 includes fixture clamp arms 27 and a clamp engaging portion 28. In at least one embodiment, the clamp engaging portion 28 includes a ridge protrusion having a gap, where the ridge may act as a guide. In another embodiment, the clamp engaging portion 28 may be formed as an aperture that extends through the clamp 26 (FIG. 4c), with a separate ridge that may act as a guide. The fixture clamp 26 is slidably mounted in a channel 29 (FIGS. 3b and 3c) inside the cassette fixture 16 and moves in a substantially horizontal plane perpendicular to the cassette fixture face 18. The fixture pin 32 hingedly supports the clamp lever 30 having a motor end 38 and a clamp end 40 (FIGS. 4a-4c and 5a-5c). The clamp lever 30 and fixture pin 32 are located at least partially inside the cassette fixture 16. The clamp end 40 of the clamp lever 30 engages the clamp engaging portion 28. The clamp cam 34 is attached to the clamp motor 36, engages the motor end 38 of the clamp lever 30 at least partially outside the cassette fixture 16. The clamp motor 36 is preferably a gear motor, but it has been contemplated that various types of other motors would suffice such as a stepper motor or servomotor. Although considered part of the cassette fixture assembly 4, the clamp motor 36 is preferably mounted at least indirectly to the staker assembly 2 (FIGS. 5a-5c).

The primary purpose of the cassette fixture assembly 4 is to place and hold the label-bearing face 19 flat against the fixture plate 22 during the staking process. After a cassette 15 is placed inside the cassette slot 20, the staking device 1 is then activated. FIGS. 5a, 5b and 5c illustrate the cassette securing position before activation of the cassette fixture assembly 4, and FIGS. 6a, 6b and 6c show the completed cassette 15 securing position after activation.

Figure 6A:
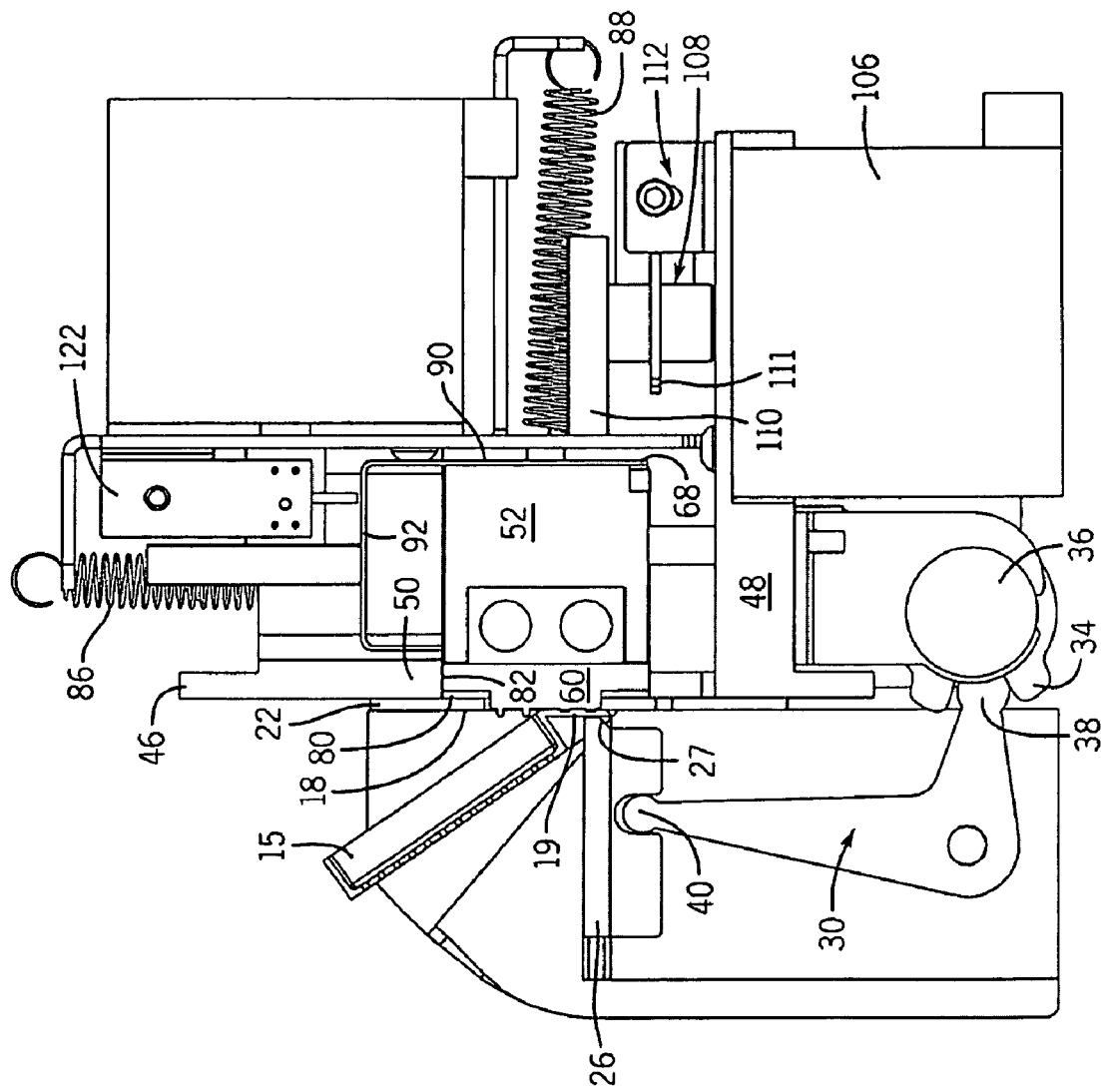
FIG. 6a is a cross-sectional view of the staking device of FIG. 2a in a burn position.
Figure 6B:
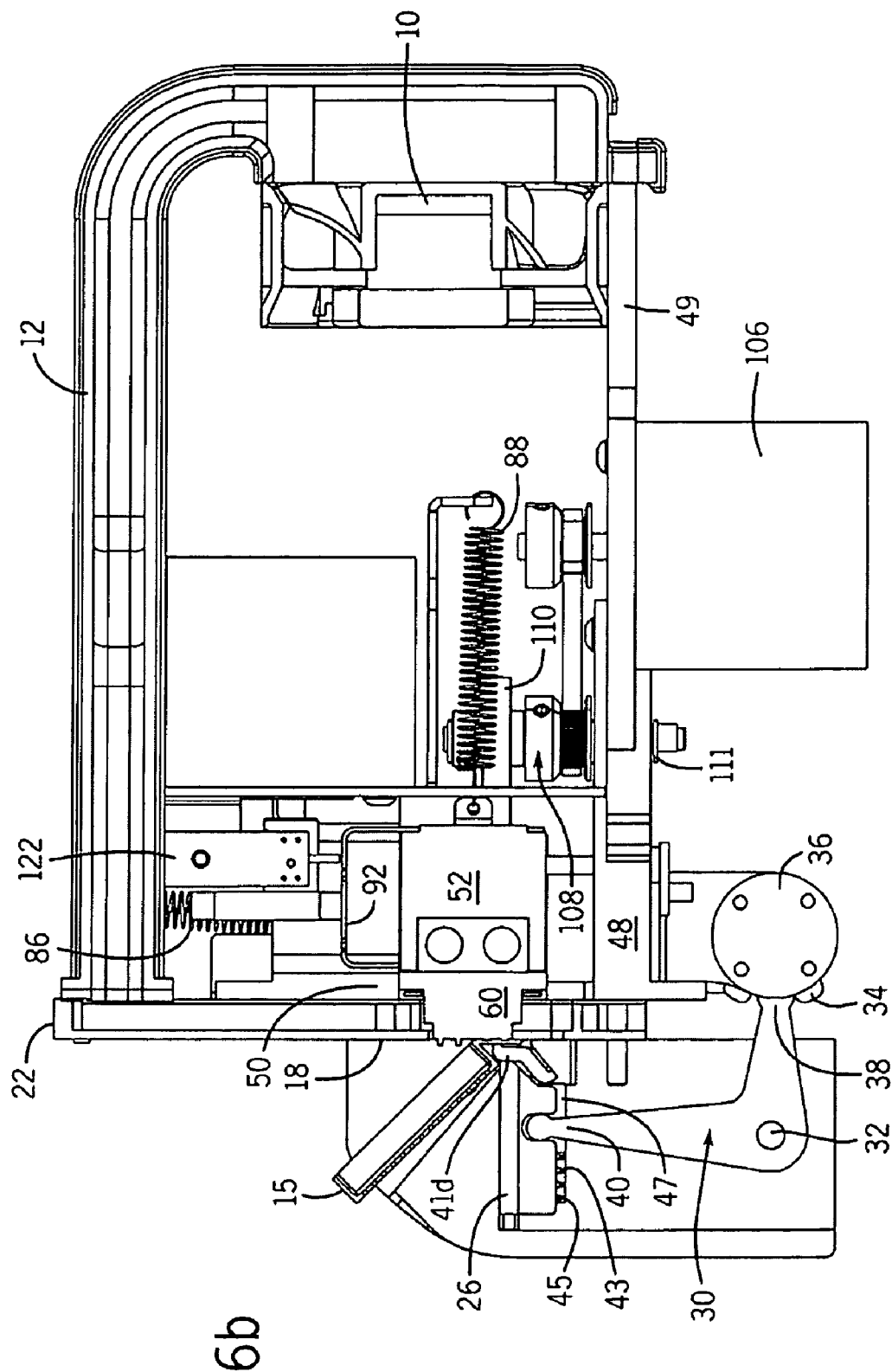
FIG. 6b is a cross-sectional view of the staking device of FIG. 2b in a burn position.

Referring to FIGS. 5a and 6a, FIG. 5a shows the device in a default position prior to activation having a cassette 15 resting in the slot 20. Upon device activation, the clamp motor 36 rotates the clamp cam 34 in a counter-clockwise direction, which rotates the motor end 38 of the clamp lever 30 downward. Due to the rotation point at the fixture pin 32, the downward motion of the motor end 38 of the clamp lever 30 forces the clamp end 40 to move substantially toward the cassette fixture face 18, thereby sliding the engaged fixture clamp 26 towards the fixture plate 22. In at least one embodiment, the clamp motor 36 stops in an engaged biasing position after the fixture clamp arms 27 have engaged the back of the label-bearing face 19 and forced the label-bearing face 19 against the fixture plate 22. At this point, the cassette 15 is in position to be staked.

In other embodiments, referring to FIGS. 5b, 5c, 6b and 6c, the sliding fixture clamp 26, at least indirectly via the fixture clamp arms 27, rotates the adjacent pivot arm upper portion 41d about the hinge mechanism 41b, the rotation being against the biasing of the pivot spring 45 pushing against the pivot arm lower portion 41c. The clamp motor 36 stops in an engaged biasing position after the pivot tabs 41e have engaged the back of the label-bearing face 19 and forced the label-bearing face 19 against the fixture plate 22 (as in FIG. 6b). These clamping mechanisms provide the flexibility for the device to engage cassettes 15 with various angled label-bearing faces 19.

Referring again to FIGS. 2a-2c, the staker assembly 2 utilizes a probe plate 44 to connect to the cassette fixture assembly 4. As shown in FIGS. 2a-2c and 5a-5c, the cassette fixture assembly 4 attaches to the staker assembly 2 by a pair of fixture screws 42. The fixture screws 42 are inserted through holes in the cassette fixture 16 and the fixture plate 22, and then engage the probe plate 44. The probe plate 44 is preferably made from a material that dissipates heat well, such as aluminum. In at least one embodiment, referring to FIG. 7a, the probe plate 44 includes a probe plate wall 46 in a vertical orientation, a probe plate base 48 that is in a horizontal plane normal to the wall 46, and probe plate supports 50 extending normal from the wall 46 at least partially in a direction opposite of the cassette fixture assembly 4. The probe plate base 48 includes at least one backstop tab slot 57.

In at least one embodiment, the staker assembly 2 includes the probe plate 44 and a backstop 54 for mounting and guiding support, a block assembly 52 that stakes a label 53 to the cassette 15, a lower rotation assembly 56 that moves the block assembly 52 into a horizontal position, and an upper rotation assembly 58 that moves the block assembly 52 into a vertical position.

Referring to FIG. 8a, in at least one embodiment the block assembly 52 includes a probe block 60, a heater block 62 with at least one heater cartridge 64 (to heat the probe block 60), a carrier 66 (for securing the heater block 62 and probe block 60), and a spring plate 68 mounted to the carrier 66. In other embodiments, referring to FIGS. 8b and 8c, the block assembly 52 may further include a heat shield 37 secured to the probe block 60 and a temperature sensor 69 situated between the carrier 66 and the heater block 62.

Referring to FIGS. 8a-8c, the probe block 60 includes at least one probe stand 70 that provides a mounting point for at least one plunge probe 72, and at least one burn probe 74. The probe stand 70 is also configured to set the depth that the plunge probe 72 will enter the label 53 and the depth that the burn probe 74 will enter the label-bearing face 19. The probe stand 70 is preferably a raised protrusion normal to a probe block face 76 with a flat shoulder surface 78 from which the plunge and burn probes 72, 74 extend. Additionally, the probe stand 70 may have multiple tiers extending from the probe block face 76, as shown in FIGS. 8b and 8c. In at least one embodiment, two linear probe spacers 80 extending from opposite sides of the probe block face 76 may include at least one notch 77 (FIGS. 8b and 8c) for securing the heat shield 37 to the probe block face 76 using a pair of screws or other securing means.

Referencing FIGS. 6a-6c and 9a-9c, when the block assembly 52 is moved towards the cassette fixture 16 (to either plunge or burn the label 53 and cassette 15) the probe spacer 80 abuts the fixture plate 22 stopping the block assembly 52 at a desired depth from the cassette fixture face 18. The probe stand 70 extends at least partially through the fixture plate 22, positioning the plunge and burn probes 72, 74 into a plunging or burning position. The plunge probe 72 and burn probe 74 are preferably circular but any shape could suffice, such as square or hexagonal. The burn probe 74 extends a short distance from the probe stand 70 and has a wide circumference. The plunge probe 72 extends a further distance from the probe stand 70 and has a narrower circumference than the burn probe 74. The short and wide dimensions of the burn probe 74 allow the burn probe 74 to create a wide hole in the label 53 affixed to the label-bearing face 19, while the narrower and longer plunge probe 72 avoids the label 53 and penetrates into the label-bearing face 19 with minimal or no contact with the label 53.

Figure 9A:
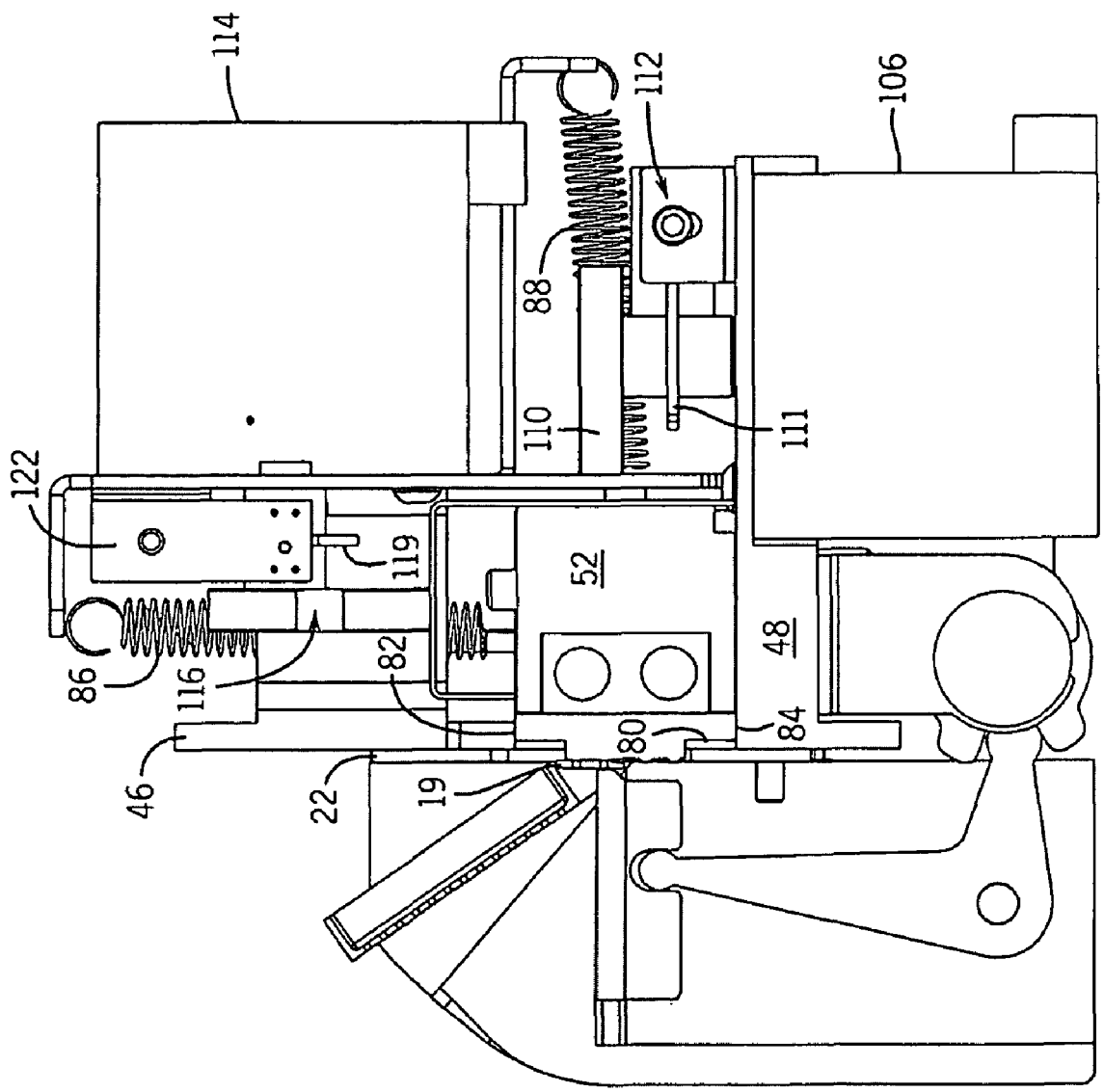
FIG. 9a is a cross-sectional view of the staking device of FIG. 2a in a plunge position.
Figure 9B:
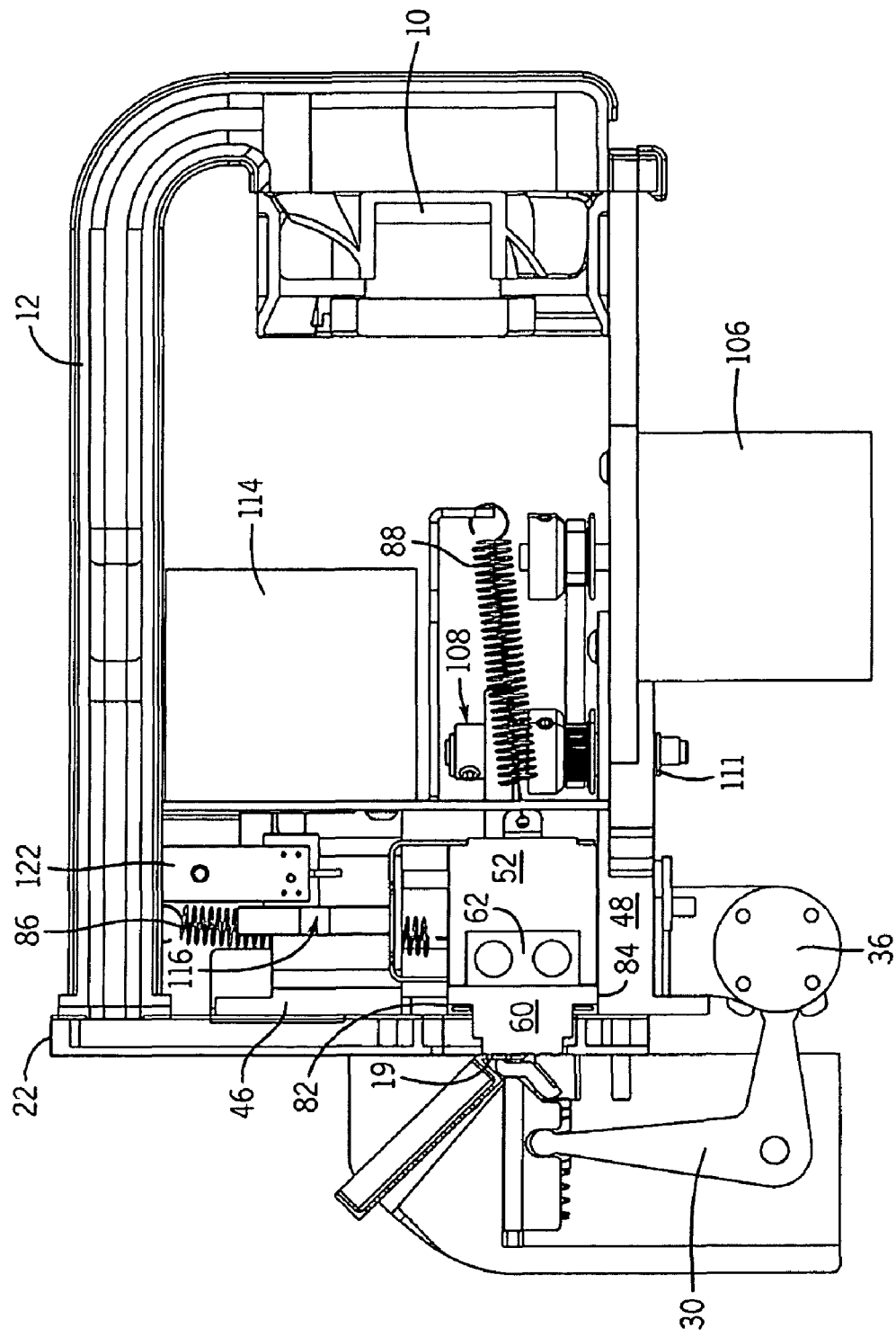
FIG. 9b is a cross-sectional view of the staking device of FIG. 2b in a plunge position.
Figure 9C:
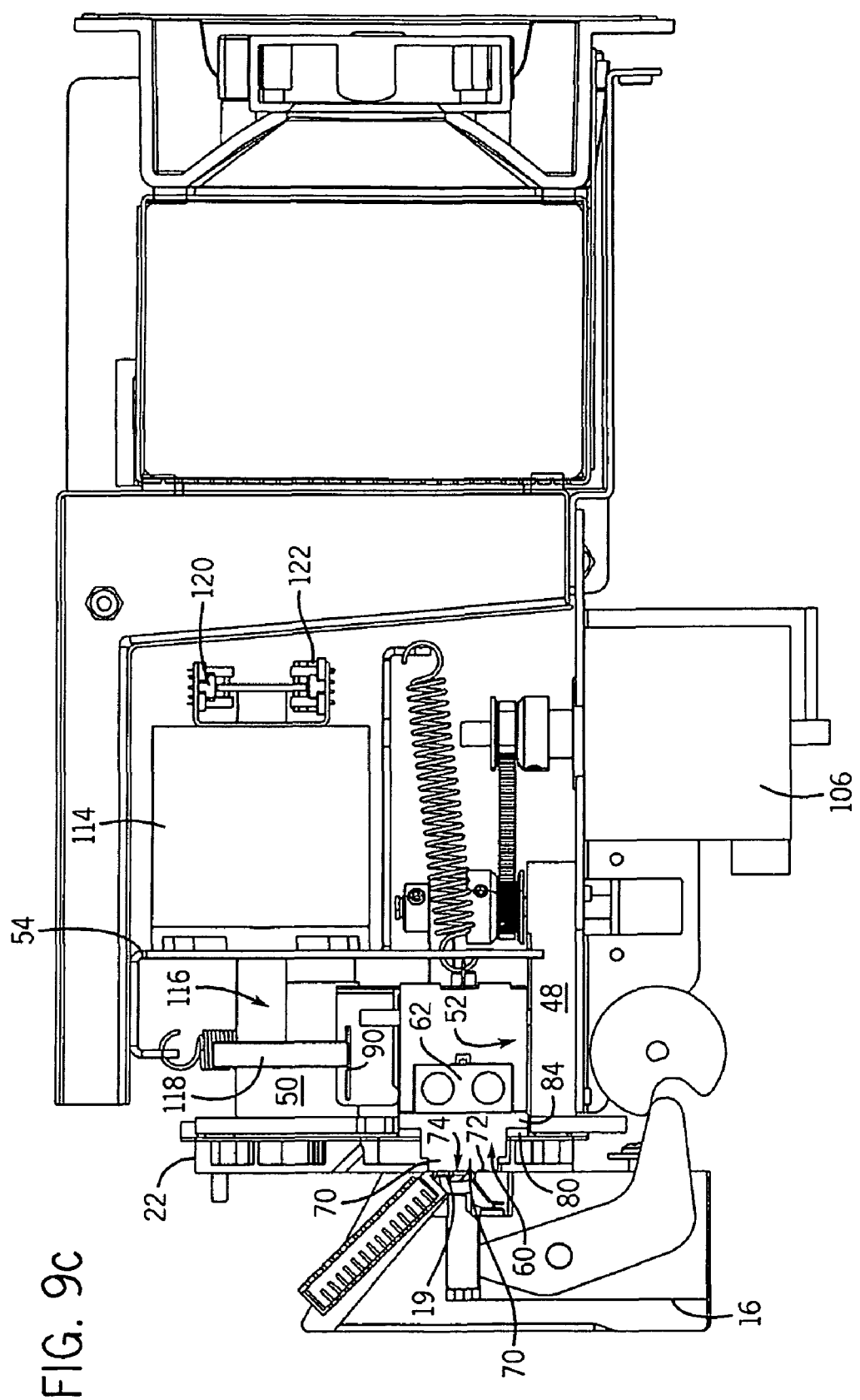
FIG. 9c is a cross-sectional view of the staking device of FIG. 2c in a plunge position.

Additionally, the probe block 60 has a block top stop 82 and a block bottom stop 84 (FIGS. 8a-8c). As seen in FIGS. 6a-6c, the block top stop 82 abuts the bottom of the probe plate supports 50 when the probe block 60 is held in its top vertical position by at least one vertical spring 86. As seen in FIGS. 9a-9c, the block bottom stop 84 abuts the top of the probe plate base 48 when the probe block 60 is forced vertically downward against the vertical spring 86 bias; this provides a fixed vertical stop. The probe block 60 is preferably formed from a single piece of copper, although several pieces may be secured together to form the probe block 60. Also, other materials may be used to form the probe block 60, such as a ceramic. Additionally, the probe block 60 may be plated with nickel or silver to minimize corrosion.

To accomplish the staking process, the plunge and burn probes 72, 74 are heated to a temperature adequate to melt (without burning) material the cassette 15 and label 53 are made of. In this embodiment, the probes 72, 74 are heated to approximately the same temperature; although in another embodiment, the plunge probe 72 may be heated to a temperature necessary to melt the cassette 15 material. The burn probe 74 may be heated to a separate temperature necessary to melt the label 53 material. Heat is transferred the heater block 62 to the probes 72, 74, which is preferably made from a material that conducts heat well, such as copper. Referring to FIG. 8a, the heater block 62 in at least one embodiment is configured to receive at least one heater cartridge 64; the heater cartridge 64 having a temperature sensor incorporated within (not shown). Although in other embodiments as shown in FIGS. 8b and 8c, the heater block 62 may utilize a separate temperature sensor 69 situated in a temperature sensor slot 75.

In reference to FIGS. 8a-8c, the probe block 60 is secured to one side of the heater block 62 with a pair of screws that may be easily removed once the cassette fixture assembly 4 has been removed from the staker assembly 2. This provides simple and rapid replacement of the probe block 60 in the field. The heater block 62 is substantially situated inside the carrier 66. The carrier 66 is configured to substantially encase the portion of the heater block 62 that is not in contact with the probe block 60. Further, the carrier 66 has slots and indents that receivably engage the mating slots and indents of the probe block 60. The carrier 66 is preferably ceramic, although other materials that insulate well may be used.

Referencing FIGS. 2a-2c, the carrier 66 is partially centered by a probe post 67 that is inserted through the bottom of the probe plate base 48 and through an oblong hole 71 in the carrier 66. The probe post 67 guides the block assembly 52 as it moves horizontally towards the cassette fixture 16 (burn and plunge position) and backward to its resting position (default position). Additionally, the probe post 67 may be used to guide the block assembly 52 as it moves vertically between the burn and plunge positions.

In at least one embodiment, the spring plate 68 is made from a single piece of shaped spring steel, although other materials and multiple pieces may be used. As shown in FIGS. 8a-8c, the spring plate 68 is affixed to the carrier 66 using a fastener such as screws that pass through the spring plate 68 and the carrier 66 and engage the heater block 62. The spring plate 68 has a horizontal surface 68a that is substantially parallel to and situated above the top of the carrier 66 (also see FIGS. 5a-5c); this surface 68a supports at least one vertical spring arm 90. The spring plate 68 also has a vertical surface 68b that is substantially parallel to the backside of the carrier 66 (also see FIGS. 5a-5c); this surface 68b supports at least one horizontal spring arm 92. Further, the spring plate 68 is secured to the backstop 54 by at least one horizontal spring 88 and one vertical spring 86 (FIGS. 5a-5c). In at least one embodiment, as shown in FIG. 8a, both spring plate ends 68c, 68d have a horizontal spring hole 94 and a vertical spring hole 96 for attaching to one end of a horizontal spring 88 and a vertical springs 86, respectively. In other embodiments as shown in FIGS. 8b and 8c, the spring plate 68 has one vertical spring arm 90 and two horizontal spring arms 92 extending from the spring plate 68; further, the spring plate 68 has one horizontal spring hole 94 (see FIGS. 5b and 5c) and two vertical spring holes 96. Additionally, the spring arms 90, 92 may be formed therefrom or otherwise secured to their respective surfaces 68a, 68b. Further, in at least one embodiment, as shown in FIG. 8c, the vertical spring arm 90 may be the same as the horizontal surface 68a.

The backstop 54 further encloses and supports the block assembly 52 as seen in FIGS. 5a-5c. Referring to FIGS. 2a-2c, the backstop 54 includes at least one backstop support tab 100 for engaging at least one backstop tab slot 57 in the probe plate base 48, at least one backstop vertical tab 102 for securing one end of the vertical spring 86, and at least one backstop horizontal tab 104 for securing the end of the horizontal spring 88. At least one embodiment includes one horizontal tab 104 and two vertical tabs 102 as shown in FIGS. 2b and 2c along with one horizontal spring 88 and two vertical springs 86. Additionally, in at least one embodiment a pair of backstop slots 98 is included to provide clearance for the block assembly screws 55 (as shown in FIG. 2a-2c). The backstop 54 is secured to the probe plate 44 by inserting the backstop support tabs 100 into the backstop tab slots 57 and fastening the backstop 54 to the probe plate supports 50 using at least one backstop screw 59 (as shown in FIGS. 5a-5c). Additionally, in at least one embodiment, a plate spacer 117 may be used between the probe plate supports 50 and the backstop 54 to create an offset for the addition of a probe plate extension 49 or for a motor mount 99 (best shown in FIGS. 2b and 2c).

Figure 10A:
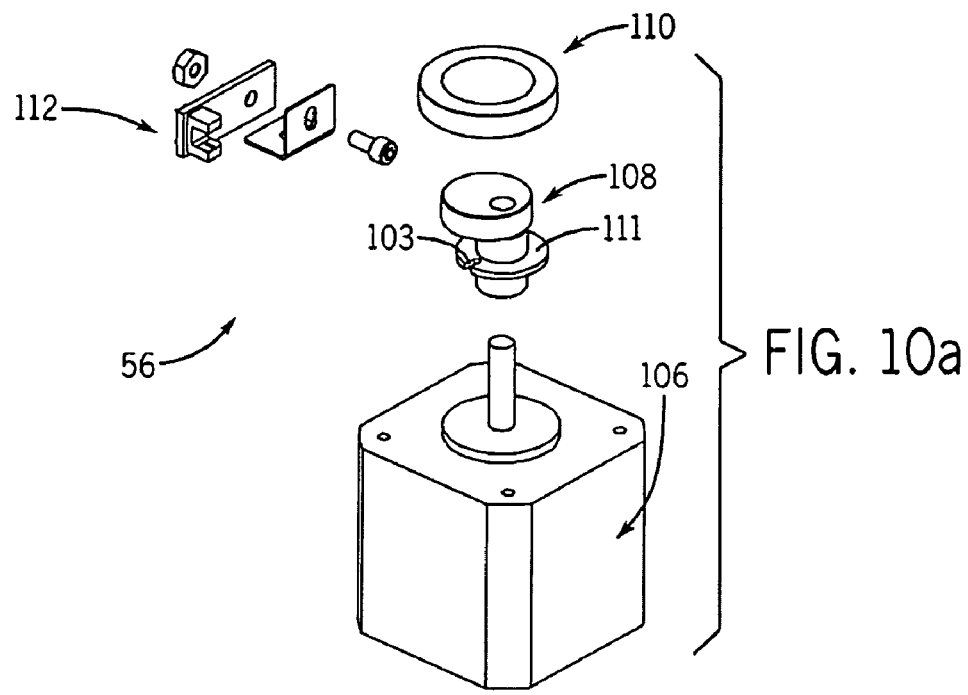
Figure 10B:
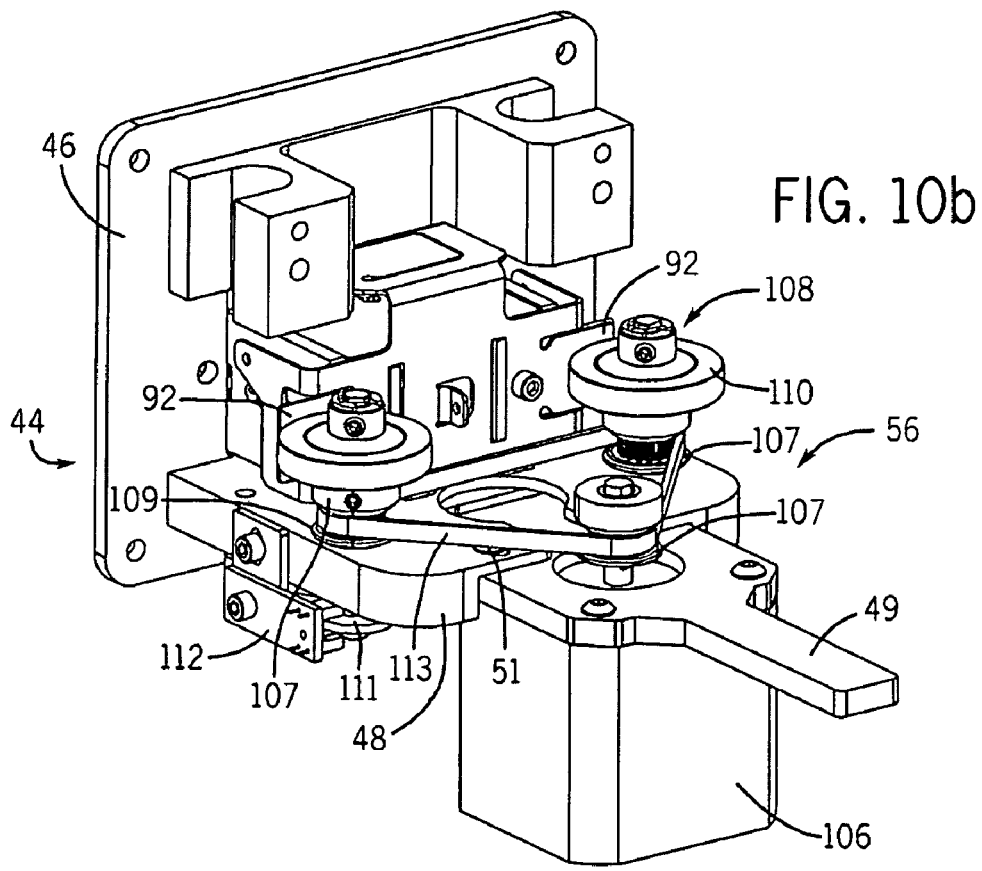
FIG. 10b is a perspective view of the lower rotation assembly 56 of FIG. 2b secured to the probe plate 44.
Figure 10C:
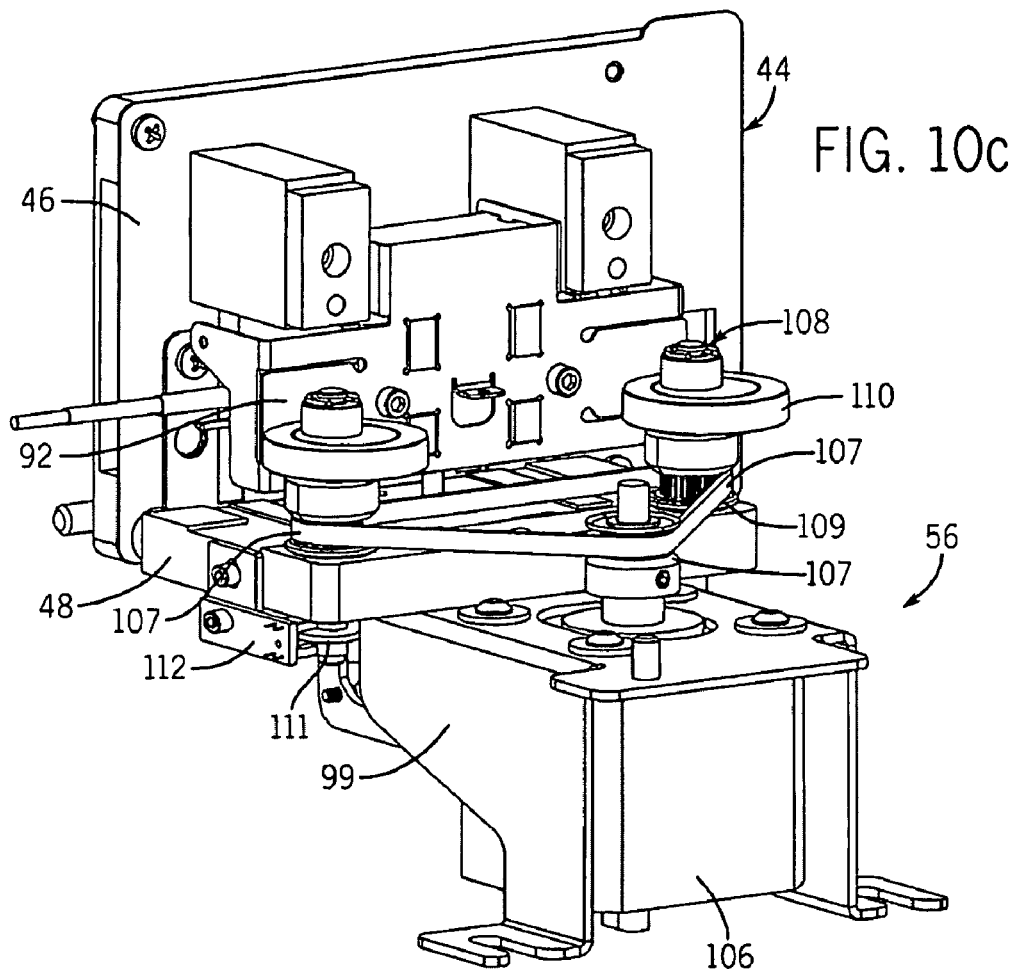
FIG. 10c is a perspective view of the lower rotation assembly 56 of FIG. 2c secured to the probe plate 44.

A lower rotation assembly 56 (FIGS. 10a-10c) and an upper rotation assembly 58 (FIGS. 11a and 11b) are used to move the block assembly 52 horizontally and vertically, respectively. Referring to FIGS. 10a-10c, the lower rotation assembly 56 includes in at least one embodiment, a lower motor 106 (preferably a stepper motor, although a gear or servo motor could be used), at least one lower cam assembly 108, at least one lower cam bearing 110, and at least one lower cam sensor 112. The lower cam assembly 108 may further include a lower cam disc 111 having a lower disc notch 103 that is monitored by the lower cam sensor 112.

In at least one embodiment, the lower motor 106 is affixed to the bottom of the probe plate base 48 and the lower cam assembly 108 is affixed to the shaft of the lower motor 106 such that the lower cam bearing 110 rests adjacent to the horizontal spring arm 92 as shown in FIG. 5a. In another embodiment, referring to FIG. 10b, a probe plate extension 49 may be adjustably secured to the probe plate base 48, with the lower motor 106 secured to the probe plate extension 49. The probe plate base 48 having at least one extension slot 51 to adjustably secure the probe plate extension 49 to the probe plate base 48. Additionally, in another embodiment as shown in FIG. 10c, a motor mount 99 is secured to the probe plate base 48, and the lower motor 106 is secured to the motor mount 99.

In another embodiment, referring to FIGS. 10b and 10c, the lower cam assembly 108 additionally includes a pulley 107 and at least one support bearing 109. Further, referring to FIG. 10b, the lower motor 106 is affixed to the probe plate extension 49 and has the pulley 107 affixed to the shaft of the lower motor 106. Additionally, two lower cam assemblies 108 are affixed to the probe plate base 48 via their support bearings 109, with their lower cam bearings 110 thereby resting adjacent to the horizontal spring arms 92. Further, the lower motor 106 uses a drive belt 113 connected to all three pulleys 107 to rotate the lower cam assemblies 108. Referring to FIG. 10c, in another embodiment the lower motor 106 is shown affixed to the motor mount 99 with the motor mount 99 further affixed to the probe plate base 48.

Figure 11A:
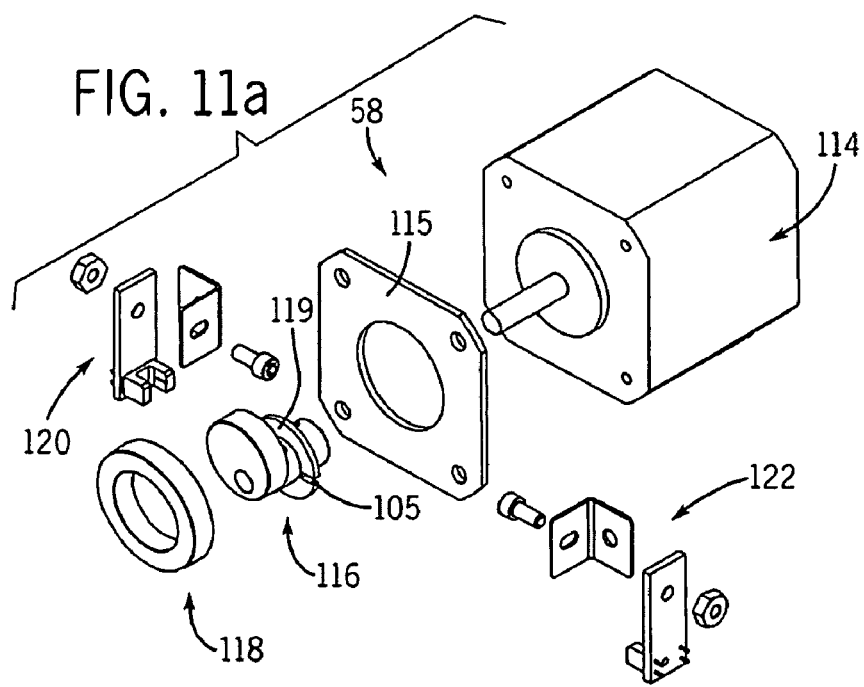
FIG. 11a is an exploded view of an upper rotation assembly 58 of FIGS. 2a and 2b, including a plunge sensor 120 and a burn sensor 122.
Figure 11B:
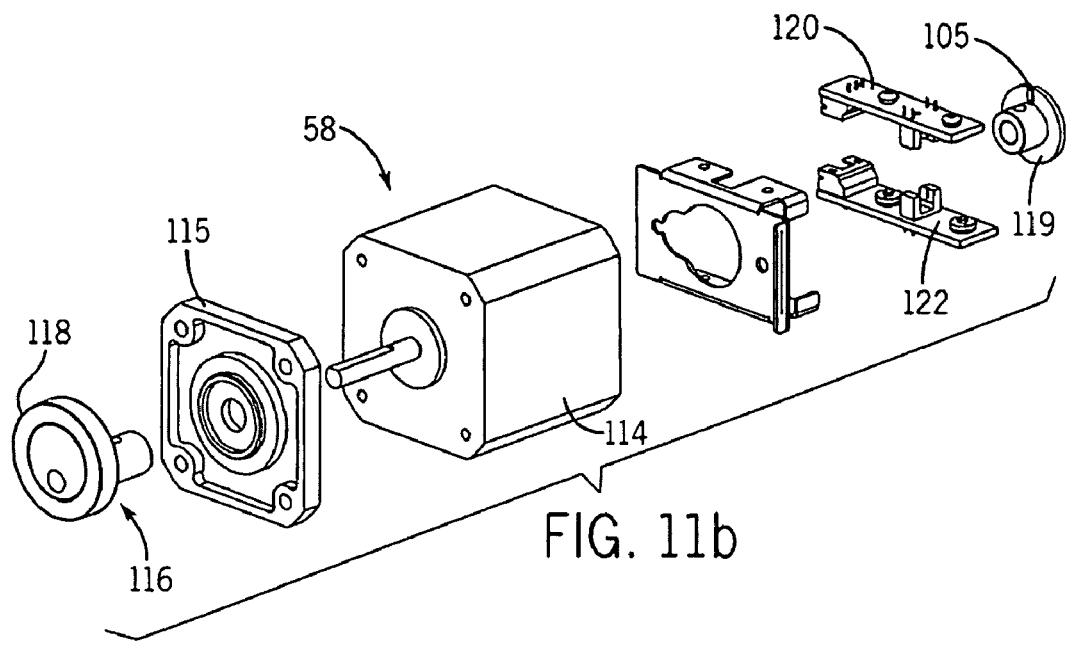
FIG. 11b is an exploded view of the upper rotation assembly 58 of FIG. 2c, including a plunge sensor 120 and a burn sensor 122.

Referring to FIG. 11a, the upper rotation assembly 58 includes an upper motor 114 (preferably a stepper motor, although a gear or servo motor could be used), a plunge sensor 120, a burn sensor 122, and an upper cam assembly 116 that includes an upper cam bearing 118. The upper motor 114 is affixed to the side of the backstop 54, with a thermal gasket 115 therebetween (FIGS. 5a-5c). The upper cam assembly 116 is affixed to the shaft of the upper motor 114 such that the upper cam 118 rests adjacent to the vertical spring arm 90 as shown in FIGS. 5a-5c. Additionally, in at least one embodiment the upper cam assembly 116 has an upper cam disc 119 that includes all upper disc notch 105 (FIG. 11a). In another embodiment, shown in FIG. 11b, the upper cam disc 119 is mounted separate from the upper cam assembly 116, at an opposite end of the shaft of the upper motor 114.

Referencing FIGS. 2a and 2b, the plunge and burn sensors 120, 122 are mounted opposite each other such that when the upper disc notch 105 is sensed by the plunge sensor 120, the upper cam assembly 116 is in a position with the lobe pushing the vertical spring arm 90 downward (as in FIGS. 9a-9c), and when the upper disc notch 105 is sensed by the burn sensor 122, the upper cam assembly 116 is in a position with the lobe not pushing the vertical spring arm 90 downward (default or burn position) (FIGS. 6a-6c). These positions are communicated to a processor. In one embodiment, the plunge and burn sensors 120, 122 are mounted to the backstop 54 (FIGS. 6a and 6b), although in another embodiment, the plunge and burn sensors 120, 122 are secured at least indirectly to the upper motor 114 (FIG. 6c).

The electrical components of the staker device 1 are monitored and controlled by the processor on an integrated circuit board (not shown) that is mounted adjacent the base 5. A process activation switch such as a pushbutton may be locally mounted on the front cover 8 or be remotely situated. To stake a label 53 on a cassette 15, a user would typically first position the label 53 on the label-bearing face 19 with a pressure sensitive adhesive. The positioning of the label 53 may be accomplished manually or by automation the user then inserts the cassette 15 in the cassette slot 20 with the label-bearing face 19 pointing downward such that it abuts the fixture plate 22 (FIGS. 5a-5c). The insertion of the cassette 15 may also be accomplished by automation.

Once the cassette 15 is inserted, the cassette sensor 35 indicates the presence of the cassette 15 and relays the information to the processor. Upon receipt by the processor of a signal that a cassette 15 is in position in the slot 20 (either manually or automatically), the processor commands the clamp motor 36 to rotate the clamp cam 34, thereby engaging the clamp lever 30, which engages and slides the fixture clamp 26 toward the fixture plate 22. In at least one embodiment the fixture clamp arms 27 engage the back of the label-bearing face 19 and force the label-bearing face 19 against the fixture plate 22 (FIG. 6a). In another embodiment, the sliding of the fixture clamp 26 pushes the fixture clamp arms 27 against the upper portion 41d of the pivot arm 41a, thereby rotating the upper portion 41d about the hinge mechanism 41b and moving the associated pivot tabs 41e into engagement with the back of the label-bearing face 19 thereby moving the label-bearing face 19 against the fixture plate 22 (FIGS. 6b and 6c). Once the label-bearing face 19 is against the fixture plate 22 the clamp motor 36 is either stalled (if a gear motor) or positioned (if a stepper motor) so as to maintain pressure on the clamp lever 30, holding the label-bearing face 19 firmly in place until the process is complete.

To stake the label 53 to the cassette 15, the burn and plunge probes 74, 72 must be heated to an adequate temperature to melt the label 53 and label-bearing face 19 material. To heat the probes 74, 72, the heater cartridges 64 are activated by the processor and their temperature is monitored by the processor in at least one embodiment by integrated temperature sensors, although another embodiment may use a separate temperature sensor 69. A preset temperature is pre-programmed in the processor based on the materials being staked. The heater cartridges 64 heat the highly conductive heater block 62 that is mounted to the probe block 60. The probe block 60 heats the probe stands 70 and burn and plunge probes 74, 72 to the requisite temperature. This heating process may occur prior to a cassette 15 being inserted or after the staking process has been activated.

With the burn and plunge probes 74, 72 heated and the cassette 15 in position, the staking process begins. Referencing FIGS. 5a-5c, the staker assembly 2 is shown in a default position with the block assembly 52 biased vertically upwards by the vertical springs 86, the top of the spring plate 68a abutting the bottom of the probe plate supports 50, the block top stop 82 abutting the probe plate wall 46 and the vertical spring arm 90 adjacent to the upper cam bearing 118. Additionally, the block assembly 52 is further biased in a rearward position by at least one horizontal spring 88, with the back of the spring plate 68b resting against the backstop 54 and at least one horizontal spring arm 92 adjacent to at least one lower cam bearing 110.

To stake the label 53, the cassette fixture assembly 4 secures the label-bearing face 19 against the fixture plate 22 (cassette 15 positioned as in FIGS. 6a-6c). The staker assembly 2 moves to a burn position, as shown in FIGS. 6a-6c; this involves moving the block assembly 52 forward towards the fixture plate 22. The processor first verifies via the burn sensor 122 that the upper cam assembly 116 is in the burn position (no upper cam assembly 116 force on the vertical spring arm 90) before moving the block assembly 52. Then, in at least one embodiment, the processor activates the lower motor 106 advancing at least one lower cam assembly 108 from a default position (low lobe) as shown in FIGS. 5a-5c, to a burn position (high lobe) as shown in FIGS. 6a-6c. The default position is sensed by the lower cam sensor 112 when the lower disc notch 103 is aligned with the lower cam sensor 112. Further, when the lower cam assembly 108 is in the burn position the lower cam bearing 110 is pushed against the at least one horizontal spring arm 92 forcing the block assembly 52 forward against the bias of the horizontal springs 88. The block assembly 52 moves forward with the burn probes 74 advancing through the fixture plate slots 23 and through the label 53, until the probe spacers 80 abut the fixture plate 22. The depth of the burn required is dependent on the depth of the label 53 and may be adjusted as needed by increasing or decreasing the probe spacer 80 heights. FIG. 12a depicts the burn probe 74 in the burn position with reference to the label 53 and the cassette 15. Once the pre-programmed burn time (a factor of the probe temperature and label material) has expired, the processor commands the lower motor 106 to rotate the lower cam assembly 108 back to the default position, relieving the force on the at least one horizontal spring arm 92 and allowing the block assembly 52 to move backward under the bias of the at least one horizontal spring 88, returning the block assembly 52 to a default position.

To complete the staking process, the block assembly 52 moves from the default position to a plunge position as shown in FIGS. 9a-9c. This position involves both a vertical and horizontal movement of the block assembly 52. To achieve the plunge position, the processor activates the upper motor 114 advancing the lobe of the upper cam assembly 116 to a plunge position (high lobe position) as seen in FIGS. 9a-9c. The plunge position is sensed by the processor when the upper disc notch 105 is aligned with the plunge sensor 120. When the upper cam assembly 116 is in the plunge position the upper cam bearing 118 is pushed against the vertical spring arm 90 forcing the block assembly 52 downward against the bias of the vertical springs 86. The block assembly 52 is moved downward by the upper cam assembly 116 until the block bottom stop 84 abuts the probe plate base 48; this position ensures the plunge probes 72 are in the same vertical position as the burn probes 74 had been while in the burn position. This alignment is necessary because the plunge probes 72 enter the label-bearing face 19 through the burn holes in the label 53.

After the vertical plunge position has been established (preferably by the plunge sensor 120), the horizontal plunge positioning may be initiated. The plunge horizontal positioning is identical to the burn horizontal positioning with the lower motor 106 and at least one lower cam assembly 108 advancing the block assembly 52 towards the fixture plate 22. The plunge probes 72 pass through the fixture plate slots 23 and through the burn holes in the label 53, and are pushed into the label-bearing face 19 (FIGS. 9a-9c). The depth of the plunge probes 72 into the label-bearing face 19 is fixed by the probe spacers 80 abutting the fixture plate 22. The amount of time required for the plunge probes 72 to melt the label-bearing face 19 material depends on the temperature of the probes 72 and the melting point of the label-bearing face 19 material. The necessary time is calculated and pre-entered into the processor prior to staking. While the plunge probes 72 are melting into the label-bearing face 19 the melted plastic is flowing out towards the probe stand 70, more particularly to the shoulder surface 78. When the melted plastic abuts the shoulder surface 78, it is forced to flow outwards away from the plunge probe 72 and over the label 53 forming the shape of a collar bond 33 as seen in FIGS. 12b and 12c. When a pre-determined time has expired, the processor commands the lower motor 106 to rotate the at least one lower cam assembly 108 to a default position, thereby removing the forward pressure on the at least one horizontal spring arm 92 and the block assembly 52, allowing horizontal spring 88 bias to return the block assembly 52 to its default horizontal position. The processor then commands the upper motor 114 to rotate the upper cam assembly 116 to a default position, thereby removing the downward pressure on the vertical spring arm 90 and the block assembly 52, allowing the vertical spring 86 bias to return the block assembly 52 to its default vertical position. FIG. 12c depicts the fully formed collar bond 33 after retraction of the plunge probes 72. The collar bond 33 in at least one embodiment includes a neck portion 124, consisting of the cassette material, that extends from cassette 15 through the label aperture 125 created by the burn probe 74 and then tapers radially outward from the aperture to form a shoulder portion 126 at least partially over the label 53.

Once the staking process is complete the processor commands the clamp motor 36 to reverse direction thereby sliding the fixture clamp 26 away from the cassette 15. In at least one embodiment this moves the fixture clamp arms 27 away from the cassette 15, allowing the label-bearing front face 19 to be released from the fixture plate 22. In another embodiment, moving the fixture clamp 26 away from the cassette 15 allows the pivot arm tabs 41e to move away from the label-bearing front face 19 (assisted by the at least one pivot spring 45 moving against the lower portion 41c of the pivot arm 41a), thereby releasing the label-bearing front face 19 and allowing the cassette 15 to be removed.

Any portion of the staking process may be accomplished manually or by automation, including various movements of the assemblies and sub-assemblies. The insertion and removal of cassettes may also be automated.

One embodiment of the device (not shown) eliminates the burn probes 74, and the upper rotation assembly 58 with the associated hardware required to move the block assembly 52 in a vertical manner. This process would only involve a horizontal movement and would advance the plunge probe 72 forward into the label-bearing face 19, burning the label 53 for the necessary time. After the label 53 is burned, the plunge probe 72 would be advanced further into the label-bearing face 19 and perform the plunge action. After the plunge action is complete the probe 72 would be moved away, completing the process.

Although the invention has been described in considerable detail by reference to the drawings, this detail is for the purpose of illustration. Many variations and modifications can be made to the invention by one skilled in the art without departing from the spirit and letter of the appended claims.

We claim:

1. A staking device 1 for permanently attaching a thermoplastic label 53 that is provisionally attached to a thermoplastic substrate 24, the device 1 comprising a cassette fixture assembly 4 for holding the substrate 24 with the provisionally attached label 53 to the device 1, the cassette fixture assembly 4 operationally combined with a staker assembly 2 for permanently attaching the label 53 to the substrate 24, staker assembly 2 comprising a block assembly 52 which includes a probe block 60 which includes a heater block 62 and burn and plunge probes 72, 74.

2. The staking device 1 of claim 1 in which the staker assembly 2 further comprises, a probe plate 44 fastened to a backstop 54 with block assembly 52 situated substantially therebetween and a lower rotation assembly 56 secured at least indirectly to the probe plate 44, and an upper rotation assembly 58 secured to the backstop 54.

3. The staking device 1 of claim 2 in which the cassette fixture assembly 4 further comprises, a cassette fixture 16 with a fixture plate 22 mounted to a cassette fixture face 18, and a clamping assembly 31 situated at least partially within the cassette fixture 16.

4. The staking device 1 of claim 3 in which the clamping assembly 31 further comprises, a clamp lever 30 with a motor end 38 and a clamp end 40, where the clamp lever 30 is pivotally supported by a fixture pin 32 and positioned substantially within the cassette fixture 16, a clamp motor 36 that rotates a clamp cam 40 which engages the motor end 38 of the clamp lever 30, and a fixture clamp 26 that is engaged by the clamp end 40 of the clamp lever 30.

5. The staking device 1 of claim 4 in which the cassette fixture assembly 4 further includes a cooling mechanism 17.

6. The staking device 1 of claim 5 in which the cooling mechanism 17 further includes a cooling fan 10, a plate channel 22a and a flow duct 13.

7. The staking device 1 of claim 5 in which the block assembly 52 further comprises, a spring plate 68 secured to a carrier 66, the spring plate 68 having a horizontal spring arm 92 for actuation by the lower rotation assembly 56 to move the block assembly 52 in a horizontal motion, and a vertical spring arm 90 for actuation by the upper rotation assembly 58 to move the block assembly 52 in a vertical motion.

8. The staking device 1 of claim 7 in which the block assembly 52 further comprises (i) carrier 66 which has a temperature sensor 69, and (ii) at least one heater cartridge 64 situated within heater block 62, where the probe block 60 is configured to engage the carrier 66 such that the heater block 62 rests adjacent the probe block 60.

9. The staking device 1 of claim 8 in which the probe block 60 further comprises a probe block face 76 having one or more probe stands 70, each probe stand 70 with one or more tiers extending from the probe block face 76, with at least one plunge probe 72 and at least one burn probe 74 extending from the probe stands 70.

10. The staking device 1 of claim 9 in which the staking device 1 further includes a fan duct 12 in connection with a filter 11, and a fuming blower 9 for expelling air received through the filter 11 via the fan duct 12.

11. A staking device 1 for permanently attaching a thermoplastic label 53 that is provisionally attached to a thermoplastic substrate 24, the device 1 comprising:

a. a probe plate 44 fastened to a backstop 54 with a block assembly 52 situated substantially therebetween, block assembly 52 comprising a probe block 60 which includes a heater block 62 and plunge and burn probes 72, 74, and a lower rotation assembly 56 secured at least indirectly to the probe plate 44, and an upper rotation assembly 58 secured to the backstop 54, b. a cassette fixture 16 with a fixture plate 22 mounted to a cassette fixture face 18, where the cassette fixture 16 includes a channel 29, and c. a clamp lever 30 with a motor end 38 and a clamp end 40, where the clamp lever 30 is hingedly supported by a fixture pin 32 and positioned at least partially within the cassette fixture 16, a clamp motor 36 that rotates a clamp cam 34 which engages the motor end 38 of the clamp lever 30, and a fixture clamp 26 that is engaged by the clamp end 40 of the clamp lever 30 and is slidably situated in the channel 29, where the probe plate 44 is secured to the cassette fixture 16 with the fixture plate 22 situated therebetween.

12. The staking device 1 of claim 11 in which the clamping assembly 31 further includes a cooling mechanism 17.

13. The staking device 1 of claim 12 in which the cooling mechanism 17 further includes a cooling fan 10, a plate channel 22*a* and a flow duct 13.

14. A staker assembly 2 for permanently attaching a thermoplastic label 53 that is provisionally attached to a thermoplastic substrate 24, the staker assembly 2 comprising a block assembly 52 which comprises a probe block 60 which includes a heater block 62 and plunge and burn probes 72, 74.

15. The staker assembly 2 of claim 14, further including an upper rotation assembly 58 and a lower rotation assembly 56 for situating the block assembly 52 in position for staking the label 53 to the substrate 24.

16. The staker assembly 2 of claim 15, further including a cassette fixture assembly 4 comprising, a cassette fixture 16, a fixture plate 22, and a clamping assembly 31, for fixing the substrate 24 for staking.

17. The staker assembly 2 of claim 16, further including a cooling mechanism 17 for cooling the fixture plate 22 and a fuming mechanism 7 for filtering vapors produced during the staking process.

\* \* \* \* \*